US012613447B2

(12) United States Patent
Chen et al.

(10) Patent No.: US 12,613,447 B2
(45) Date of Patent: Apr. 28, 2026

(54) TWO-DIMENSIONAL ELECTRONIC SUM-FREQUENCY GENERATION APPARATUS AND METHODS

(71) Applicants: Honda Motor Co., Ltd., Tokyo (JP); Utah State University, Logan, UT (US)

(72) Inventors: Gugang Chen, Palo Alto, CA (US); Yi Rao, Logan, UT (US); Zhi-Chao Huang-Fu, Logan, UT (US)

(73) Assignees: HONDA MOTOR CO., LTD., Tokyo (JP); UTAH STATE UNIVERSITY, Logan, UT (US)

( * ) Notice: Subject to any disclaimer, the term of this patent is extended or adjusted under 35 U.S.C. 154(b) by 347 days.

(21) Appl. No.: 18/439,513

(22) Filed: Feb. 12, 2024

(65) Prior Publication Data

US 2025/0258420 A1 Aug. 14, 2025

(51) Int. Cl.
| | |
|---|---|
| *G02F 1/35* | (2006.01) |
| *G02F 1/39* | (2006.01) |
| *H01S 3/16* | (2006.01) |

(52) U.S. Cl.
CPC ............ *G02F 1/3534* (2013.01); *G02F 1/392* (2021.01); *H01S 3/1625* (2013.01); *H01S 3/1636* (2013.01); *G02F 2203/11* (2013.01)

(58) Field of Classification Search
CPC .... G02F 1/3534; G02F 1/392; G02F 2203/11; H01S 3/1625; H01S 3/1636
See application file for complete search history.

(56) References Cited

U.S. PATENT DOCUMENTS

| | | | | |
|---|---|---|---|---|
| 8,248,687 | B2 * | 8/2012 | Nishimura | G02F 1/39 |
| | | | | 359/345 |
| 10,191,354 | B1 * | 1/2019 | Qian | H01S 3/10023 |
| 10,935,379 | B2 * | 3/2021 | Huang | H04B 10/70 |
| 2006/0044642 | A1 * | 3/2006 | Pan | G02F 1/39 |
| | | | | 359/330 |

(Continued)

OTHER PUBLICATIONS

Deng, G.-H.; Wei, Q.; Qian, Y.; Zhang, T.; Leng, X.; Rao, Y. Development of interface-/surface-specific two-dimensional electronic spectroscopy. Review of Scientific Instruments 2021, 92 (2), 023104.

(Continued)

*Primary Examiner* — Daniel Petkovsek

(74) *Attorney, Agent, or Firm* — Patterson + Sheridan, LLP

(57) ABSTRACT

Aspects of the present disclosure generally relate to two-dimensional electronic apparatuses and methods of use. A two-dimensional electronic sum frequency generation (2D-ESFG) apparatus includes an amplifier including a laser source. A broadband optical parametric amplifier (BOPA) is optically coupled to the amplifier. The BOPA includes a two-stage amplifier. An etalon is optically coupled to the amplifier. The etalon includes two or more partially reflective substrate optical flats. A noncollinear optical parametric amplifier (NOPA) is optically coupled to the amplifier. A dispersive filter pulse shaper is optically coupled to the NOPA. A synchronizer including a galvanometer mirror is optically coupled to the BOPA, the etalon, and the dispersive filter pulse shaper. A detector is optically coupled to the synchronizer.

20 Claims, 6 Drawing Sheets

(56) References Cited

U.S. PATENT DOCUMENTS

2019/0271595 A1\*   9/2019   Chowdhury ......... G01N 21/636
2023/0396031 A1\*   12/2023   Zuegel ................... G02F 1/392

OTHER PUBLICATIONS

Brida, D.; Manzoni, C.; Cerullo, G. Phase-locked pulses for two-dimensional spectroscopy by a birefringent delay line. Opt. Lett. 2012, 37 (15), 3027-3029.

Rehault, J.; Maiuri, M.; Oriana, A.; Cerullo, G. Two-dimensional electronic spectroscopy with birefringent wedges. Review of Scientific Instruments 2014, 85 (12), 123107.

Bloem, R.; Garrett-Roe, S.; Strzalka, H.; Hamm, P.; Donaldson, P. Enhancing signal detection and completely eliminating scattering using quasi-phase-cycling in 2D IR experiments. Opt. Express 2010, 18 (26), 27067-27078.

Kumar, S. K. K.; Tamimi, A.; Fayer, M. D. Comparisons of 2D IR measured spectral diffusion in rotating frames using pulse shaping and in the stationary frame using the standard method. The Journal of Chemical Physics 2012, 137 (18), 184201.

Rock, W.; Li, Y.-L.; Pagano, P.; Cheatum, C. M. 2D IR Spectroscopy using Four-Wave Mixing, Pulse Shaping, and IR Upconversion: A Quantitative Comparison. The Journal of Physical Chemistry A 2013, 117 (29), 6073-6083.

Tan, H.-S. Theory and phase-cycling scheme selection principles of collinear phase coherent multi-dimensional optical spectroscopy. The Journal of Chemical Physics 2008, 129 (12), 124501.

Zhang, Z.; Wells, K. L.; Hyland, E. W. J.; Tan, H.-S. Phase-cycling schemes for pump-probe beam geometry two-dimensional electronic spectroscopy. Chemical Physics Letters 2012, 550, 156-161.

Mukamel, S. Principles of nonlinear optical spectroscopy. Oxford University Press on Demand: 1999.

Tournois, P. Acousto-optic programmable dispersive filter for adaptive compensation of group delay time dispersion in laser systems. Optics Communications 1997, 140 (4), 245-249.

Verluise, F.; Laude, V.; Cheng, Z.; Spielmann, C.; Tournois, P. Amplitude and phase control of ultrashort pulses by use of an acousto-optic programmable dispersive filter: pulse compression and shaping. Opt. Lett. 2000, 25 (8), 575-577.

Tyagi, P.; Saari, J. I.; Walsh, B.; Kabir, A.; Crozatier, V.; Forget, N.; Kambhampati, P. Two-Color Two-Dimensional Electronic Spectroscopy Using Dual Acousto-Optic Pulse Shapers for Complete Amplitude, Phase, and Polarization Control of Femtosecond Laser Pulses. The Journal of Physical Chemistry A 2013, 117 (29), 6264-6269.

Jonas, D. M. Two-Dimensional Femtosecond Spectroscopy. Annual Review of Physical Chemistry 2003, 54 (1), 425-463.

Hamm, P.; Lim, M.; DeGrado William, F.; Hochstrasser Robin, M. The two-dimensional IR nonlinear spectroscopy of a cyclic pentapeptide in relation to its three-dimensional structure. Proceedings of the National Academy of Sciences 1999, 96 (5), 2036-2041.

Hamm, P.; Zanni, M. Concepts and Methods of 2D Infrared Spectroscopy. Cambridge University Press: 2011.

Park, S.; Kwak, K.; Fayer, M. D. Ultrafast 2D-IR vibrational echo spectroscopy: a probe of molecular dynamics. Laser Physics Letters 2007, 4 (10), 704-718.

Baiz, C. R.; Blasiak, B.; Bredenbeck, J.; Cho, M.; Choi, J.-H.; Corcelli, S. A.; Dijkstra, A. G.; Feng, C.-J.; Garrett-Roe, S.; Ge, N.-H.; Hanson-Heine, M. W. D.; Hirst, J. D.; Jansen, T. L. C.; Kwac, K.; Kubarych, K. J.; Londergan, C. H.; Maekawa, H.; Reppert, M.; Saito, S.; Roy, S.; Skinner, J. L.; Stock, G.; Straub, J. E.; Thielges, M. C.; Tominaga, K.; Tokmakoff, A.; Torii, H.; Wang, L.; Webb, L. J.; Zanni, M. T. Vibrational Spectroscopic Map, Vibrational Spectroscopy, and Intermolecular Interaction. Chemical Reviews 2020, 120 (15), 7152-7218.

Merchant, K. A.; Thompson, D. E.; Fayer, M. D. Two-Dimensional Time-Frequency Ultrafast Infrared Vibrational Echo Spectroscopy. Physical Review Letters 2001, 86 (17), 3899-3902.

Cervetto, V.; Helbing, J.; Bredenbeck, J.; Hamm, P. Double-resonance versus pulsed Fourier transform two-dimensional infra-red spectroscopy: An experimental and theoretical comparison. The Journal of Chemical Physics 2004, 121 (12), 5935-5942.

Deflores, L. P.; Nicodemus, R. A.; Tokmakoff, A. Two-dimensional Fourier transform spectroscopy in the pump-probe geometry. Opt. Lett. 2007, 32 (20), 2966-2968.

Cho, M.; Fleming, G. R. Two-Dimensional Electronic-Vibrational Spectroscopy Reveals Cross-Correlation between Solvation Dynamics and Vibrational Spectral Diffusion. The Journal of Physical Chemistry B 2020, 124 (49), 11222-11235.

Xiang, B.; Ribeiro, R. F.; Dunkelberger, A. D.; Wang, J.; Li, Y.; Simpkins, B. S.; Owrutsky, J. C.; Yuen-Zhou, J.; Xiong, W. Two-dimensional infrared spectroscopy of vibrational polaritons. Proceedings of the National Academy of Sciences 2018, 115 (19), 4845-4850.

Kraack, J. P.; Hamm, P. Surface-Sensitive and Surface-Specific Ultrafast Two-Dimensional Vibrational Spectroscopy. Chemical Reviews 2017, 117 (16), 10623-10664.

Wang, J.; Clark, M. L.; Li, Y.; Kaslan, C. L.; Kubiak, C. P.; Xiong, W. Short-Range Catalyst-Surface Interactions Revealed by Heterodyne Two-Dimensional Sum Frequency Generation Spectroscopy. The Journal of Physical Chemistry Letters 2015, 6 (21), 4204-4209.

Richter, J. M.; Branchi, F.; Valduga de Almeida Camargo, F.; Zhao, B.; Friend, R. H.; Cerullo, G.; Deschler, F. Ultrafast carrier thermalization in lead iodide perovskite probed with two-dimensional electronic spectroscopy. Nature Communications 2017, 8 (1), 376.

Jha, A.; Duan, H.-G.; Tiwari, V.; Nayak, P. K.; Snaith, H. J.; Thorwart, M.; Miller, R. J. D. Direct Observation of Ultrafast Exciton Dissociation in Lead Iodide Perovskite by 2D Electronic Spectroscopy. ACS Photonics 2018, 5 (3), 852-860.

Engel, G. S.; Calhoun, T. R.; Read, E. L.; Ahn, T.-K.; Mancal, T.; Cheng, Y.-C.; Blankenship, R. E.; Fleming, G. R. Evidence for wavelike energy transfer through quantum coherence in photosynthetic systems. Nature 2007, 446 (7137), 782-786.

Fuller, F. D.; Pan, J.; Gelzinis, A.; Butkus, V.; Senlik, S. S.; Wilcox, D. E.; Yocum, C. F.; Valkunas, L.; Abramavicius, D.; Ogilvie, J. P. Vibronic coherence in oxygenic photosynthesis. Nature Chemistry 2014, 6 (8), 706-711.

Womick, J. M.; Moran, A. M. Vibronic Enhancement of Exciton Sizes and Energy Transport in Photosynthetic Complexes. The Journal of Physical Chemistry B 2011, 115 (6), 1347-1356.

Dean, J. C.; Mirkovic, T.; Toa, Z. S. D.; Oblinsky, D. G.; Scholes, G. D. Vibronic Enhancement of Algae Light Harvesting. Chem 2016, 1 (6), 858-872.

Lim, J.; Palecek, D.; Caycedo-Soler, F.; Lincoln, C. N.; Prior, J.; von Berlepsch, H.; Huelga, S. F.; Plenio, M. B.; Zigmantas, D.; Hauer, J. Vibronic origin of long-lived coherence in an artificial molecular light harvester. Nature Communications 2015, 6 (1), 7755.

Bakulin, A. A.; Morgan, S. E.; Kehoe, T. B.; Wilson, M. W. B.; Chin, A. W.; Zigmantas, D.; Egorova, D.; Rao, A. Real-time observation of multiexcitonic states in ultrafast singlet fission using coherent 2D electronic spectroscopy. Nature Chemistry 2016, 8 (1), 16-23.

Schlau-Cohen, G. S.; Dawlaty, J. M.; Fleming, G. R. Ultrafast Multidimensional Spectroscopy: Principles and Applications to Photosynthetic Systems. IEEE Journal of Selected Topics in Quantum Electronics 2012, 18 (1), 283-295.

Brixner, T.; Stenger, J.; Vaswani, H. M.; Cho, M.; Blankenship, R. E.; Fleming, G. R. Two-dimensional spectroscopy of electronic couplings in photosynthesis. Nature 2005, 434 (7033), 625-628.

Arsenault, E. A.; Schile, A. J.; Limmer, D. T.; Fleming, G. R. Vibronic coupling in energy transfer dynamics and two-dimensional electronic-vibrational spectra. The Journal of Chemical Physics 2021, 155 (5), 054201.

Seiler, H.; Palato, S.; Sonnichsen, C.; Baker, H.; Socie, E.; Strandell, D. P.; Kambhampati, P. Two-dimensional electronic spectroscopy reveals liquid-like lineshape dynamics in CsPbI3 perovskite nanocrystals. Nature Communications 2019, 10 (1), 4962.

Lee, Y.; Das, S.; Malamakal, R. M.; Meloni, S.; Chenoweth, D. M.; Anna, J. M. Ultrafast Solvation Dynamics and Vibrational Coherences of Halogenated Boron-Dipyrromethene Derivatives Revealed through Two-Dimensional Electronic Spectroscopy. Journal of the American Chemical Society 2017, 139 (41), 14733-14742.

US 12,613,447 B2

Page 3

(56)　　　　　References Cited

OTHER PUBLICATIONS

Zanni, M. T.; Hochstrasser, R. M. Two-dimensional infrared spectroscopy: a promising new method for the time resolution of structures. Current Opinion in Structural Biology 2001, 11 (5), 516-522.

Shim, S.-H.; Strasfeld David, B.; Ling Yun, L.; Zanni Martin, T. Automated 2D IR spectroscopy using a mid-IR pulse shaper and application of this technology to the human islet amyloid polypeptide. Proceedings of the National Academy of Sciences 2007, 104 (36), 14197-14202.

Alperstein Ariel, M.; Ostrander Joshua, S.; Zhang Tianqi, O.; Zanni Martin, T. Amyloid found in human cataracts with two-dimensional infrared spectroscopy. Proceedings of the National Academy of Sciences 2019, 116 (14), 6602-6607.

Tiwari, V.; Matutes, Y. A.; Gardiner, A. T.; Jansen, T. L. C.; Cogdell, R. J.; Ogilvie, J. P. Spatially-resolved fluorescence-detected two-dimensional electronic spectroscopy probes varying excitonic structure in photosynthetic bacteria. Nature Communications 2018, 9 (1), 4219.

Ghosh, A.; Ostrander, J. S.; Zanni, M. T. Watching Proteins Wiggle: Mapping Structures with Two-Dimensional Infrared Spectroscopy. Chemical Reviews 2017, 117 (16), 10726-10759.

Fuller, F. D.; Ogilvie, J. P. Experimental Implementations of Two-Dimensional Fourier Transform Electronic Spectroscopy. Annual Review of Physical Chemistry 2015, 66 (1), 667-690.

Moody, G.; Cundiff, S. T. Advances in multi-dimensional coherent spectroscopy of semiconductor nanostructures. Advances in Physics: X 2017, 2 (3), 641-674.

Dean, J. C.; Scholes, G. D. Coherence Spectroscopy in the Condensed Phase: Insights into Molecular Structure, Environment, and Interactions. Accounts of Chemical Research 2017, 50 (11), 2746-2755.

Ginsberg, N. S.; Cheng, Y.-C.; Fleming, G. R. Two-Dimensional Electronic Spectroscopy of Molecular Aggregates. Accounts of Chemical Research 2009, 42 (9), 1352-1363.

Schlau-Cohen, G. S.; Ishizaki, A.; Fleming, G. R. Two-dimensional electronic spectroscopy and photosynthesis: Fundamentals and applications to photosynthetic light-harvesting. Chemical Physics 2011, 386 (1), 1-22.

Milota, F.; Sperling, J.; Nemeth, A.; Mancal, T.; Kauffmann, H. F. Two-Dimensional Electronic Spectroscopy of Molecular Excitons. Accounts of Chemical Research 2009, 42 (9), 1364-1374.

Halpin, A.; Johnson, P. J. M.; Tempelaar, R.; Murphy, R. S.; Knoester, J.; Jansen, T. L. C.; Miller, R. J. D. Two-dimensional spectroscopy of a molecular dimer unveils the effects of vibronic coupling on exciton coherences. Nature Chemistry 2014, 6 (3), 196-201.

Zhao, W.; Qin, Z.; Zhang, C.; Wang, G.; Huang, X.; Li, B.; Dai, X.; Xiao, M. Optical Gain from Biexcitons in CsPbBr3 Nanocrystals Revealed by Two-dimensional Electronic Spectroscopy. The Journal of Physical Chemistry Letters 2019, 10 (6), 1251-1258.

Wells, K. L.; Lambrev, P. H.; Zhang, Z.; Garab, G.; Tan, H.-S. Pathways of energy transfer in LHCII revealed by room- temperature 2D electronic spectroscopy. Physical Chemistry Chemical Physics 2014, 16 (23), 11640-11646.

Tian, P.; Keusters, D.; Suzaki, Y.; Warren Warren, S. Femtosecond Phase-Coherent Two-Dimensional Spectroscopy. Science 2003, 300 (5625), 1553-1555.

Wang, Z.; Lenngren, N.; Amarotti, E.; Hedse, A.; Ídek, K.; Zheng, K.; Zigmantas, D.; Pullerits, T. Excited States and Their Dynamics in CdSe Quantum Dots Studied by Two-Color 2D Spectroscopy. The Journal of Physical Chemistry Letters 2022, 13 (5), 1266-1271.

Zhu, X. D.; Suhr, H.; Shen, Y. R. Surface vibrational spectroscopy by infrared-visible sum frequency generation. Phys Rev B Condens Matter 1987, 35 (6), 3047-3050.

Shen, Y. R. Surface-Properties Probed by 2nd-Harmonic and Sum-Frequency Generation. Nature 1989, 337 (6207), 519-525.

Zhang, D.; Gutow, J.; Eisenthal, K. B. Vibrational Spectra, Orientations, and Phase Transitions in Long-Chain Amphiphiles at the Air/Water Interface: Probing the Head and Tail Groups by Sum Frequency Generation. The Journal of Physical Chemistry 1994, 98 (51), 13729-13734.

Yamaguchi, S.; Tahara, T. Precise Electronic X(2) Spectra of Molecules Adsorbed at an Interface Measured by Multiplex Sum Frequency Generation. The Journal of Physical Chemistry B 2004, 108 (50), 19079-19082.

Belkin, M. A.; Shen, Y. R. Non-linear optical spectroscopy as a novel probe for molecular chirality. International Reviews in Physical Chemistry 2005, 24 (2), 257-299.

Richmond, G. L. Molecular Bonding and Interactions at Aqueous Surfaces as Probed by Vibrational Sum Frequency Spectroscopy. Chemical Reviews 2002, 102 (8), 2693-2724.

Shultz, M. J.; Schnitzer, C.; Simonelli, D.; Baldelli, S. Sum frequency generation spectroscopy of the aqueous interface: Ionic and soluble molecular solutions. International Reviews in Physical Chemistry 2000, 19 (1), 123-153.

Chen, Z.; Shen, Y. R.; Somorjai, G. A. Studies of Polymer Surfaces by Sum Frequency Generation Vibrational Spectroscopy. Annual Review of Physical Chemistry 2002, 53 (1), 437-465.

Wang, H.-F.; Gan, W.; Lu, R.; Rao, Y.; Wu, B.-H. Quantitative spectral and orientational analysis in surface sum frequency generation vibrational spectroscopy (SFG-VS). International Reviews in Physical Chemistry 2005, 24 (2), 191-256.

Superfine, R.; Huang, J. Y.; Shen, Y. R. Phase measurement for surface infrared-visible sum-frequency generation. Opt. Lett. 1990, 15 (22), 1276-1278.

Feller, M. B.; Chen, W.; Shen, Y. R. Investigation of surface-induced alignment of liquid-crystal molecules by optical second-harmonic generation. Physical Review A 1991, 43 (12), 6778-6792.

Superfine, R.; Huang, J. Y.; Shen, Y. R. Nonlinear optical studies of the pure liquid/vapor interface: Vibrational spectra and polar ordering. Physical Review Letters 1991, 66 (8), 1066-1069.

Zhu, X. D.; Daum, W.; Xiao, X.-D.; Chin, R.; Shen, Y. R. Coverage dependence of surface optical second-harmonic generation from CO/Ni(110): Investigation with a nonlinear-interference technique. Physical Review B 1991, 43 (14), 11571-11580.

Du, Q.; Superfine, R.; Freysz, E.; Shen, Y. R. Vibrational spectroscopy of water at the vapor/water interface. Physical Review Letters 1993, 70 (15), 2313-2316.

Du, Q.; Freysz, E.; Shen, Y. R. Vibrational spectra of water molecules at quartz/water interfaces. Physical Review Letters 1994, 72 (2), 238-241.

Shen, Y. R. Nonlinear-Optical Studies of Surfaces. Applied Physics a—Materials Science & Processing 1994, 59 (5), 541-543.

Shen, Y. R. Surfaces Probed by Nonlinear Optics. Surface Science 1994, 299 (1-3), 551-562.

Cremer, P. S.; Mcintyre, B. J.; Salmeron, M.; Shen, Y. R.; Somorjai, G. A. Monitoring surfaces on the molecular level during catalytic reactions at high pressure by sum frequency generation vibrational spectroscopy and scanning tunneling microscopy. Catal Lett 1995, 34 (1), 11-18.

Baldelli, S.; Markovic, N.; Ross, P.; Shen, Y.-R.; Somorjai, G. Sum Frequency Generation of CO on and Polycrystalline Platinum Electrode Surfaces: Evidence for SFG Invisible Surface CO. The Journal of Physical Chemistry B 1999, 103 (42), 8920-8925.

Miranda, P. B.; Shen, Y. R. Liquid Interfaces: A Study by Sum-Frequency Vibrational Spectroscopy. The Journal of Physical Chemistry B 1999, 103 (17), 3292-3307.

Geiger, F. M. Second Harmonic Generation, Sum Frequency Generation, and X(3): Dissecting Environmental Interfaces with a Nonlinear Optical Swiss Army Knife. Annual Review of Physical Chemistry 2009, 60 (1), 61-83.

Jubb, A. M.; Hua, W.; Allen, H. C. Environmental Chemistry at Vapor/Water Interfaces: Insights from Vibrational Sum Frequency Generation Spectroscopy. Annual Review of Physical Chemistry 2012, 63 (1), 107-130.

Yan, E. C. Y.; Fu, L.; Wang, Z.; Liu, W. Biological Macromolecules at Interfaces Probed by Chiral Vibrational Sum Frequency Generation Spectroscopy. Chemical Reviews 2014, 114 (17), 8471-8498.

(56) References Cited

OTHER PUBLICATIONS

Yamaguchi, S.; Tahara, T. Development of Electronic Sum Frequency Generation Spectroscopies and Their Application to Liquid Interfaces. The Journal of Physical Chemistry C 2015, 119 (27), 14815-14828.

Chou, K. C.; Markovic, N. M.; Kim, J.; Ross, P. N.; Somorjai, G. A. An in Situ Time-Dependent Study of CO Oxidation on Ptin Aqueous Solution by Voltammetry and Sum Frequency Generation. The Journal of Physical Chemistry B 2003, 107 (8), 1840-1844.

Tyrode, E.; Rutland, M. W.; Bain, C. D. Adsorption of CTAB on Hydrophilic Silica Studied by Linear and Nonlinear Optical Spectroscopy. Journal of the American Chemical Society 2008, 130 (51), 17434-17445.

Kearns, P. M.; Sohrabpour, Z.; Massari, A. M. Frequency comb SFG: a new approach to multiplex detection. Opt. Express 2016, 24 (17), 19863-19870.

Rivera, C. A.; Fourkas, J. T. Reexamining the interpretation of vibrational sum-frequency generation spectra. International Reviews in Physical Chemistry 2011, 30 (4), 409-443.

Chiang, K.-Y.; Dalstein, L.; Wen, Y.-C. Affinity of Hydrated Protons at Intrinsic Water/Vapor Interface Revealed by Ion-Induced Water Alignment. The Journal of Physical Chemistry Letters 2020, 11 (3), 696-701.

Li, Y.; Wang, J.; Xiong, W. Probing Electronic Structures of Organic Semiconductors at Buried Interfaces by Electronic Sum Frequency Generation Spectroscopy. The Journal of Physical Chemistry C 2015, 119 (50), 28083-28089.

Covert, P. A.; Hore, D. K. Geochemical Insight from Nonlinear Optical Studies of Mineral-Water Interfaces. Annual Review of Physical Chemistry 2016, 67 (1), 233-257.

Nihonyanagi, S.; Mondal, J. A.; Yamaguchi, S.; Tahara, T. Structure and Dynamics of Interfacial Water Studied by Heterodyne-Detected Vibrational Sum-Frequency Generation. Annual Review of Physical Chemistry 2013, 64 (1), 579-603.

Moon, A. P.; Pandey, R.; Bender, J. A.; Cotton, D. E.; Renard, B. A.; Roberts, S. T. Using Heterodyne-Detected Electronic Sum Frequency Generation to Probe the Electronic Structure of Buried Interfaces. The Journal of Physical Chemistry C 2017, 121 (34), 18653-18664.

Adhikari, N. M.; Premadasa, U. I.; Rudy, Z. J.; Cimatu, K. L. A. Orientational Analysis of Monolayers at Low Surface Concentrations Due to an Increased Signal-to-Noise Ratio Using Broadband Sum Frequency Generation Vibrational Spectroscopy. Appl. Spectrosc. 2019, 73 (10), 1146-1159.

Johnson, C. M.; Baldelli, S. Vibrational Sum Frequency Spectroscopy Studies of the Influence of Solutes and Phospholipids at Vapor/Water Interfaces Relevant to Biological and Environmental Systems. Chemical Reviews 2014, 114 (17), 8416-8446.

Uehara, T. M.; de Aguiar, H. B.; Bergamaski, K.; Miranda, P. B. Adsorption of Alkylthiol Self-Assembled Monolayers on Gold and the Effect of Substrate Roughness: A Comparative Study Using Scanning Tunneling Microscopy, Cyclic Voltammetry, Second-Harmonic Generation, and Sum-Frequency Generation. The Journal of Physical Chemistry C 2014, 118 (35), 20374-20382.

Vila Verde, A.; Bolhuis, P. G.; Campen, R. K. Statics and Dynamics of Free and Hydrogen-Bonded OH Groups at the Air/Water Interface. The Journal of Physical Chemistry B 2012, 116 (31), 9467-9481.

Roke, S.; Roeterdink, W. G.; Wijnhoven, J. E. G. J.; Petukhov, A. V.; Kleyn, A. W.; Bonn, M. Vibrational Sum Frequency Scattering from a Submicron Suspension. Physical Review Letters 2003, 91 (25), 258302.

Feng, R.-j.; Lin, L.; Li, Y.-y.; Liu, M.-h.; Guo, Y.; Zhang, Z. Effect of $Ca^{2+}$ to Sphingomyelin Investigated by Sum Frequency Generation Vibrational Spectroscopy. Biophysical Journal 2017, 112 (10), 2173-2183.

Deng, G.-H.; Li, X.; Liu, S.; Zhang, Z.; Lu, Z.; Guo, Y. Successive Adsorption of Cations and Anions of Water-1-Butyl-3-methylimidazolium Methylsulfate Binary Mixtures at the Air-Liquid Interface Studied by Sum Frequency Generation Vibrational Spectroscopy and Surface Tension Measurements. The Journal of Physical Chemistry C 2016, 120 (22), 12032-12041.

Wang, H.; Xu, Q.; Liu, Z.; Tang, Y.; Wei, G.; Shen, Y. R.; Liu, W.-T. Gate-Controlled Sum-Frequency Vibrational Spectroscopy for Probing Charged Oxide/Water Interfaces. The Journal of Physical Chemistry Letters 2019, 10 (19), 5943-5948.

Wen, Y.-C.; Zha, S.; Liu, X.; Yang, S.; Guo, P.; Shi, G.; Fang, H.; Shen, Y. R.; Tian, C. Unveiling Microscopic Structures of Charged Water Interfaces by Surface-Specific Vibrational Spectroscopy. Physical Review Letters 2016, 116 (1), 016101.

Liu, S.; Liu, A.-a.; Wen, B.; Zhang, R.; Zhou, C.; Liu, L.-M.; Ren, Z. Coverage Dependence of Methanol Dissociation on TiO2(110). The Journal of Physical Chemistry Letters 2015, 6 (16), 3327-3334.

Rao, Y.; Comstock, M.; Eisenthal, K. B. Absolute Orientation of Molecules at Interfaces. The Journal of Physical Chemistry B 2006, 110 (4), 1727-1732.

Esenturk, O.; Walker, R. A. Surface vibrational structure at alkane liquid/vapor interfaces. The Journal of Chemical Physics 2006, 125 (17), 174701.

Isaienko, O.; Nihonyanagi, S.; Sil, D.; Borguet, E. Observation of the Bending Mode of Interfacial Water at Silica Surfaces by Near-Infrared Vibrational Sum-Frequency Generation Spectroscopy of the [Stretch + Bend] Combination Bands. The Journal of Physical Chemistry Letters 2013, 4 (3), 531-535.

Zhang, Z.; Kim, J.; Khoury, R.; Saghayezhian, M.; Haber, L. H.; Plummer, E. W. Surface sum frequency generation spectroscopy on non-centrosymmetric crystal GaAs (001). Surface Science 2017, 664, 21-28.

Stiopkin, I. V.; Weeraman, C.; Pieniazek, P. A.; Shalhout, F. Y.; Skinner, J. L.; Benderskii, A. V. Hydrogen bonding at the water surface revealed by isotopic dilution spectroscopy. Nature 2011, 474 (7350), 192-195.

Chowdhury, A. U.; Liu, F.; Watson, B. R.; Ashkar, R.; Katsaras, J.; Patrick Collier, C.; Lutterman, D. A.; Ma, Y.-Z.; Calhoun, T. R.; Doughty, B. Flexible approach to vibrational sum-frequency generation using shaped near-infrared light. Opt. Lett. 2018, 43 (9), 2038-2041.

Wang, Z.; Carter, J. A.; Lagutchev, A.; Koh, Y. K.; Seong, N.-H.; Cahill, D. G.; Dlott, D. D. Ultrafast Flash Thermal Conductance of Molecular Chains. Science 2007, 317 (5839), 787-790.

Pullanchery, S.; Kulik, S.; Rehl, B.; Hassanali, A.; Roke, S. Charge transfer across C—H—O hydrogen bonds stabilizes oil droplets in water. Science 2021, 374 (6573), 1366-1370.

Bredenbeck, J.; Ghosh, A.; Smits, M.; Bonn, M. Ultrafast Two Dimensional-Infrared Spectroscopy of a Molecular Monolayer. Journal of the American Chemical Society 2008, 130 (7), 2152-2153.

Nihonyanagi, S.; Singh, P. C.; Yamaguchi, S.; Tahara, T. Ultrafast Vibrational Dynamics of a Charged Aqueous Interface by Femtosecond Time-Resolved Heterodyne-Detected Vibrational Sum Frequency Generation. Bulletin of the Chemical Society of Japan 2012, 85 (7), 758-760.

Singh, P. C.; Nihonyanagi, S.; Yamaguchi, S.; Tahara, T. Ultrafast vibrational dynamics of water at a charged interface revealed by two-dimensional heterodyne-detected vibrational sum frequency generation. The Journal of Chemical Physics 2012, 137 (9), 094706.

Xiong, W.; Laaser, J. E.; Mehlenbacher, R. D.; Zanni, M. T. Adding a dimension to the infrared spectra of interfaces using heterodyne detected 2D sum-frequency generation spectroscopy. Proceedings of the National Academy of Sciences of the United States of America 2011, 108 (52), 20902-20907.

Dunkelberger, E. B.; Grechko, M.; Zanni, M. T. Transition Dipoles from 1D and 2D Infrared Spectroscopy Help Reveal the Secondary Structures of Proteins: Application to Amyloids. The Journal of Physical Chemistry B 2015, 119 (44), 14065-14075.

Deng, G.-H.; Qian, Y.; Rao, Y. Development of ultrafast broadband electronic sum frequency generation for charge dynamics at surfaces and interfaces. The Journal of Chemical Physics 2019, 150 (2), 024708.

Deng, G.-H.; Qian, Y.; Wei, Q.; Zhang, T.; Rao, Y. Interface-Specific Two-Dimensional Electronic Sum Frequency Generation Spectroscopy. The Journal of Physical Chemistry Letters 2020, 11 (5), 1738-1745.

(56) References Cited

OTHER PUBLICATIONS

Deng, G.-H.; Qian, Y.; Zhang, T.; Han, J.; Chen, H.; Rao, Y. Two-dimensional electronic-vibrational sum frequency spectroscopy for interactions of electronic and nuclear motions at interfaces. Proceedings of the National Academy of Sciences 2021, 118 (34), e2100608118.

* cited by examiner

TWO-DIMENSIONAL ELECTRONIC SUM-FREQUENCY GENERATION APPARATUS AND METHODS

GOVERNMENT RIGHTS

This invention was made with government support under Grant Number 2045084 awarded by the National Science Foundation. The government has certain rights in the invention.

FIELD

Aspects of the present disclosure generally relate to two-dimensional electronic apparatus and methods of use.

BACKGROUND

Ultrafast multidimensional spectroscopy can be utilized investigate chemical and physical processes of molecules, determine energy transfer and electronic coupling in photochemistry systems, and identify ultrafast nonequilibrium behaviors of biological systems. Among the various techniques, two-dimensional electronic spectroscopy (2D-ES) has become the general technique for assessing energy transfer and electronic interactions among exitons and distinct electronic states in diverse materials, e.g., molecules, nanomaterials, semiconductors, and photosynthetic complexes. 2D-ES spreads the electronic spectrum into a second dimension, enabling the correlation of coupled electronic modes through cross peaks, and providing added dynamic information through 2D line shapes. Unfortunately, 2D-ES lacks specificity when examining electronic and energy transfer dynamics at surfaces and interfaces. Conventional techniques to improve 2D-ES include implementing a second-order nonlinear optical spectroscopy technique, e.g., vibrational and electronic sum frequency generation (2D-VSFG and 2D-ESFG) technique. However, both 2D-VSFG and 2D-ESFG lack multidimensional capabilities and require a broadband laser source with high pulse energy and low temporal chirp to generate ESFG signal.

Conventional approaches to overcome these limitations having included generating a short-wave infrared (SWIR) using an optical parametric amplifier to develop a Translating Wedge based Identical pulses eNcoading System (TWINS). However, the time delay between two pump pulses at different wavelengths in the birefringent wedges of a TWINS-based 2D-ESFG is different. Accordingly, the time zero between two pump pulses has to be determined prior to analysis. Additionally, the lack of a time zero between two pump pulses prevents conventional phase control techniques used in 2D-ES and 2D-ESFG to be implemented, limiting the removal of scattering, rapid data collection, and the ability to obtain a background-free spectra.

There is a need for a new two-dimensional electronic apparatus and methods of use.

SUMMARY

Aspects of the present disclosure generally relate to a two-dimensional electronic apparatus and methods of use. The 2D-ESFG apparatus described herein can include a visible pulse shaper and a pump-probe geometry capable of controlling pulse shapes, allowing for optimized data acquisition and can separate rephrasing and non-rephrasing signals. By controlling pulse shapes of 2D-ESFG apparatus, increased control over the delay and phase for the pump pulses can be obtained, and the ability to separate rephrasing and non-rephasing signals can be achieved. 2D-ESFG apparatus described herein can be implemented on a broader range of interfacial systems and/or surfaces compared to conventional 2D-ESFG spectrometers, allowing the electronic structure and dynamics of interface and surface species in environmental, catalytical, and biological systems to be determined.

Aspects of the present disclosure can provide two-dimensional electronic sum frequency generation (2D-ESFG) apparatuses. The 2D-ESFG includes an amplifier including a laser source. A broadband optical parametric amplifier (BOPA) is optically coupled to the amplifier. The BOPA includes a two-stage amplifier. An etalon is optically coupled to the amplifier. The etalon includes two or more partially reflective substrate optical flats. A noncollinear optical parametric amplifier (NOPA) is optically coupled to the amplifier. A dispersive filter pulse shaper is optically coupled to the NOPA. A synchronizer including a galvanometer mirror is optically coupled to the BOPA, the etalon, and the dispersive filter pulse shaper. A detector is optically coupled to the synchronizer.

Aspects of the present disclosure can also provide two-dimensional electronic sum frequency generation (2D-ESFG) apparatuses. The 2D-ESFG includes an amplifier including a laser source adapted to emit a laser light. A noncollinear optical parametric amplifier (NOPA) is adapted to shape the laser light emitted from the amplifier. A dispersive filter pulse shaper is adapted to generate a pulse pump pair from the laser light shaped by the NOPA. A synchronizer including aa galvanometer mirror is adapted to reflect the pulse pump pair. A detector is adapted to detect a wavelength of the pulse pump pair.

Aspects of the present disclosure can also provide methods. The methods can include emitting a light from an amplifier to a first beam splitter. The first beam splitter is configured to produce a first portion of light and a second portion of light. A third portion of light and a fourth portion of light are produced by directing the second portion of light to a second beam splitter. The first portion of light is directed to a broadband optical parametric amplifier (BOPA). The third portion of light is directed to etalon including two or more partially reflective substrate optical flats. The fourth portion of light is directed to a noncollinear optical parametric amplifier (NOPA). The fourth portion of light exits the NOPA and is directed to a dispersive filter pulse shaper. An ESF light is produced by overlaying the first portion of light exiting the BOPA, the third portion of light exiting the etalon, and the fourth portion of light exiting the dispersive filter pulse shaper on a sample. The ESF light is split using a synchronizer to form a first portion of ESFG light and a second portion of ESFG light. The first portion of ESFG light and the second portion of ESFG light are detected.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

DETAILED DESCRIPTION

Aspects of the present disclosure generally relate to two-dimensional electronic apparatus and methods of use. The present disclosure provides 2D-ESFG apparatus using a dispersive filter pulse shaper and a pump-probe geometry capable of controlling pulse shapes, allowing for optimized data acquisition and can separate rephrasing and non-rephasing signals. By controlling pulse shapes of 2D-ESFG apparatus, increased control over the delay and phase for the pump pulses of light can be obtained, and the ability to separate rephrasing and non-rephasing signals can be achieved. In at least one aspect, 2D-ESFG apparatus of the present disclosure can be implemented on a broader range of interfacial systems and/or surfaces compared to conventional 2D-ESFG spectrometers, allowing determination of the electronic structure and dynamics of interface and surface species in environmental, catalytic, and biological systems.

Apparatus

Figure 1:
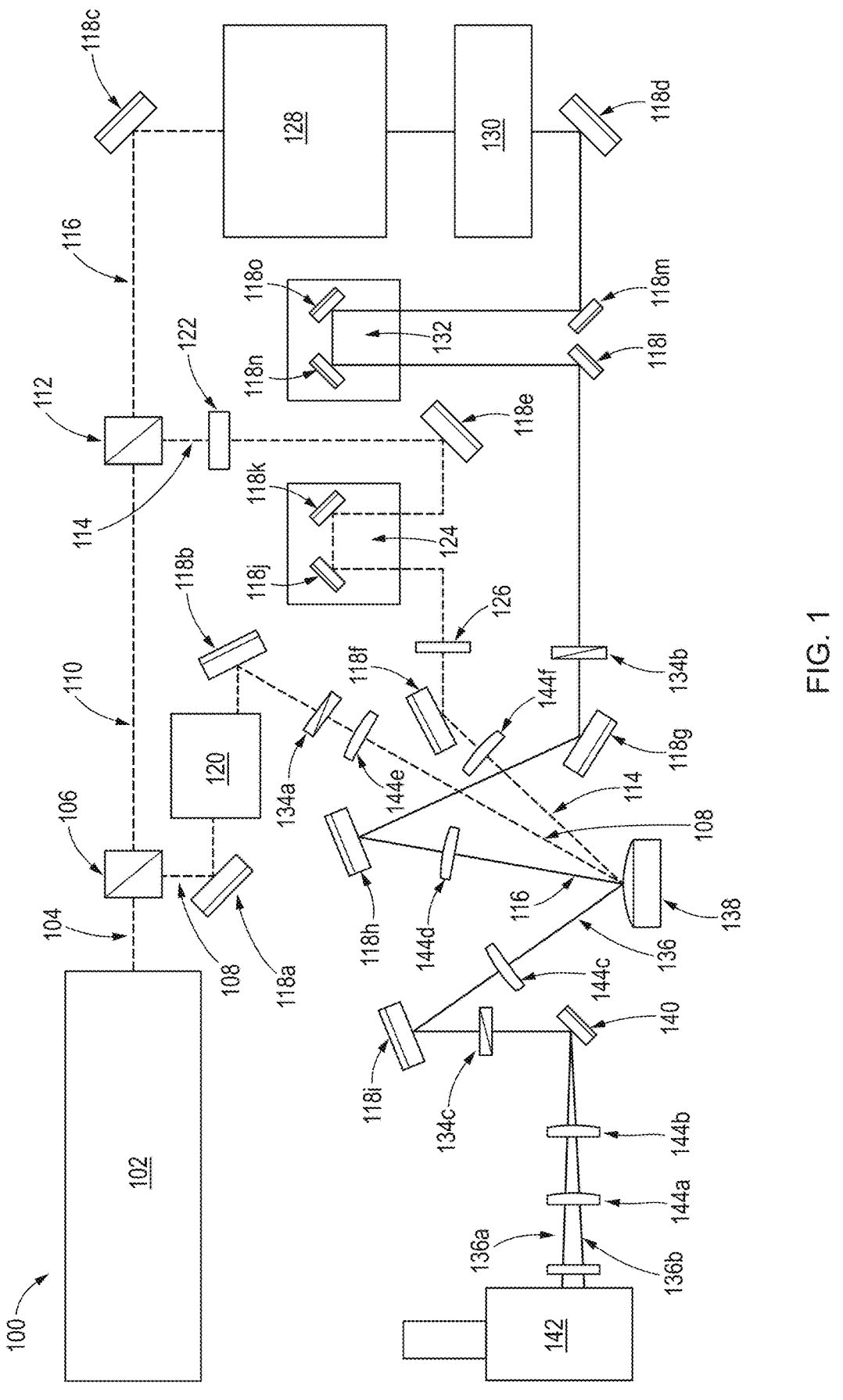
FIG. 1 is a schematic view of an example two-dimensional electronic sum-frequency generation spectrometer according to at least one aspect of the present disclosure.

FIG. 1 shows a schematic view of an example two-dimensional electronic sum-frequency generation apparatus (2D-ESFG) 100. The 2D-ESFG 100 includes an amplifier 102. The amplifier 102 can include an energy source, e.g., a laser source. In an aspect, the laser source can include a titanium (Ti) based laser. For example, the laser source can include a titanium:sapphire (Ti:sapphire) laser or a titanium:alumina (Ti:Al$_2$O$_3$) laser. The laser generates a laser light 104, e.g., a light wave having spatial coherence.

The 2D-ESFG 100 can include a first beam splitter 106 optically coupled to the amplifier. The first beam splitter 106 can include an optical device including one or more prisms that can reflect about 40% to about 60% of a laser light 104 and concurrently transmit about 40% to about 60% of the laser light 104. For example, the first beam splitter 106 can split the laser light 104 into a first portion of light 108 and a second portion of light 110. For example, the first beam splitter 106 can reflect about 50% of the laser light 104 as a first portion of light 108. Concurrently, the first beam splitter 106 can transmit about 50% of the laser light 104 as a second portion of light 110.

The first beam splitter 106 is optically coupled to a broadband optical parametric amplifier (BOPA) 120 via the first portion of light 108. The BOPA 120 can include a two-stage amplifier suitable for producing a plurality of wavelengths by an optical parametric amplification process. In an aspect, the first portion of light 108 can be directed to the BOPA 120 using one or more mirrors 118*a-o*, as described herein.

The 2D-ESFG 100 can include a second beam splitter 112 optically coupled to the first beam splitter 106 via the second portion of light 110. The second beam splitter 112 can include any suitable beam splitter described herein, such as the first beam splitter 106. For example, the second beam splitter 112 can split the second portion of light 110 into a third portion of light 114 and a fourth portion of light 116. For example, the second beam splitter 112 can reflect about 50% of the second portion of light 110 as a third portion of light 114. Concurrently, the first beam splitter 106 can transmit about 50% of the second portion of light 110 as a fourth portion of light 116.

The second beam splitter 112 is optically coupled to an etalon 122 via the third portion of light 114. An etalon 122 can include two or more partially reflective substrate optical flats that are spaced about 1 μm to about 100 cm apart, e.g., about 1 μm to about 10 μm, about 10 μm to about 100 μm, about 100 μm to about 1 cm, about 1 cm to about 10 cm, or about 10 cm to about 100 cm. In an aspect, the two or more partially reflective substrate optical flats are oriented parallel to one another such that light may reflect in the etalon until it reaches an optical cavity. In an aspect, the third portion of light 114 can be directed through an etalon 122 using one or more mirrors 118*a-o*, as described herein.

In an aspect, the 2D-ESFG 100 can include a first stage 124. The first stage 124 can include a motorized stage. The motorized stage can translate one or more mirrors, optical elements, focusing lenses, filters, reflectors, or a combination thereof attached and/or secured to the motorized stage, where the one or more mirrors optical elements, focusing lenses, filters, reflectors, or a combination thereof are optically coupled to the etalon 122 via the third portion of light 114 that exits the etalon 122.

A narrow-band filter 126 is optically coupled to the etalon 122. In an aspect, the third portion of light 114 can exit the etalon 122 and be directed to the narrow-band filter 126. The narrow-band filter 126 can selectively transmit the third portion of light 114 that is about 0.1 nm to about 10 nm outside of a predetermined wavelength, e.g., about 800 nm. For example, the narrow-band filter 126 can selectively transmit the third portion of light 114 having a wavelength of about 800 nm, where the third portion of light 114 having a wavelength of less than 790 nm or greater than 810 nm may be reflected and/or absorbed by the narrow-band filter 126. As a further example, the narrow-band filter 126 can selectively transmit the third portion of light 114 having a wavelength of about 800 nm, where the third portion of light 114 having a wavelength of less than 799.9 nm or greater than 800.1 nm may be reflected and/or absorbed by the narrow-band filter 126.

The second beam splitter 112 is optically coupled to a noncollinear optical parametric amplifier (NOPA) 128 via the fourth portion of light 116. The NOPA 128 can include a noncollinear amplifier suitable for producing a plurality of wavelengths by allowing a constant gain up to second order in wavelengths by an optical parametric amplification process, which can provide a wider bandwidth than an optical parametric amplifier. For example, the NOPA 128 can be produce a 1400 nm laser by doubling an 800 μJ, 800 nm, 100 fs, laser using a second harmonic generation crystal. Additionally, and as a further example, a white light seed laser may be produced using 1 to 2 μJ, 800 nm, 100 fs, laser. The 1400 nm laser and the white light seed laser may be overlapped on a Beta barium borate (BBO) crystal at an angle of about 4° to about 6° to generate a broadband laser. In an aspect, the second beam splitter 112 can be optically coupled to the NOPA 128 using one or more mirrors 118a-o, as described herein.

A dispersive filter pulse shaper 130 is optically coupled to an exit of the NOPA 128. The dispersive filter pulse shaper 130 generates a delayed pulse pair from a single input pulse. For example, the fourth portion of light 116 can be directed to the NOPA 128, where the fourth portion of light 116 may exit the NOPA 128 and be directed to the dispersive filter pulse shaper 130. The dispersive filter pulse shaper 130 can include an acousto-optic dispersive filter pulse shaper, which may produce a delayed pulse pair from a single input pulse using a longitudinal interaction between a polychromatic acoustic wave and a polychromatic optical wave in the bulk of a birefringent crystal. For example, the dispersive filter pulse shaper can include a Dazzler™, by FastLite, Antibes, France.

In an aspect, the 2D-ESFG 100 can include a second stage 132. The second stage 132 can include a motorized stage. The motorized stage can translate one or more mirrors, optical elements, focusing lenses, filters, reflectors, or a combination thereof attached and/or secured to the motorized stage, where the one or more mirrors optical elements, focusing lenses, filters, reflectors, or a combination thereof are optically coupled to the dispersive filter pulse shaper 130 via the fourth portion of light 116 that exits the dispersive filter pulse shaper 130.

The 2D-ESFG 100 can include one or more mirrors 118a-o optically coupled to the first portion of light 108, second portion of light 110, third portion of light 114, fourth portion of light 116, and/or an ESFG light 136 (e.g., light aligned into a single incident plane after interacting with the sample 138). The one or more mirrors 118a-o can provide greater than 90% reflectance of the first portion of light 108, third portion of light 114, and/or the fourth portion of light 116, e.g., greater than 90% reflectance, greater than 91% reflectance, greater than 92% reflectance, greater than 93% reflectance, greater than 94% reflectance, greater than 95%, greater than 96%, greater than 97%, greater than 98%, or greater than 99%.

The 2D-ESFG 100 can include one or more polarizers 134a-c optically coupled to the first portion of light 108, second portion of light 110, third portion of light 114, fourth portion of light 116, and/or an ESFG light 136. In an aspect, the one or more polarizers 134a-c can include a wave plate (not shown). The wave plate can include a half-wave plate and/or a quarter-wave plate. A half-wave plate can shift the polarization direction of linearly polarized light, e.g., p to s or s to p. A quarter-wave plate can shift the polarization direction of linearly polarized light to circularly polarized light.

A sample 138 can be placed in a holder of the 2D-ESFG 100, where the sample 138 is optically coupled to the BOPA 120, etalon 122, NOPA 128, and the dispersive filter pulse shaper 130 via the first portion of light 108, the third portion of light 114, and the fourth portion of light 116. The sample 138 can include a single crystalline sample, e.g., p-type gallium arsenide (GaAs), n-type Gallium phosphide (GaP) In-type GaP (100). The sample 138 can include an aqueous sample, e.g., organic fluid, aqueous fluid, water, or a combination thereof.

A synchronizer 140 is optically coupled to the sample 138, via the ESFG light 136. The synchronizer 140 can include a galvanometer mirror. The galvanometer mirror can include a single axis system capable of reflecting light along a first plane or a dual axis system capable of reflecting light along a first plane and/or a second plane. For example, the galvanometer mirror can include a single-axis galvanometer mirror. The galvanometer mirror can include a max beam diameter of about 5 mm to about 10 mm, e.g., about 5 mm to about 6 mm, about 6 mm to about 7 mm, about 7 mm to about 8 mm, about 8 mm to about 9 mm, or about 9 mm to about 10 mm. The galvanometer mirror can include a wavelength range of about 400 nm to about 20 μm, e.g., about 400 nm to about 1 μm, about 1 μm to about 10 μm, or about 10 μm to about 20 μm. The galvanometer mirror can include a repeatability of about 10 microradians (μrad) to about 20 μrad, e.g., about 10 μrad to about 13 μrad, about 13 μrad to about 16 μrad, or about 16 μrad to about 20 μrad. The galvanometer mirror can include a linearity of about 98% to about 99.9%, e.g., about 99.9%. The galvanometer mirror can include a damage threshold of about 0.25 J/cm$^2$ to about 3 J/cm$^2$ using a 10 ns pulse, e.g., about 0.25 J/cm$^2$ to about 1.0 J/cm$^2$, about 1.0 J/cm$^2$ to about 2.0 J/cm$^2$, or about 2.0 J/cm$^2$ to about 3.0 J/cm$^2$. The galvanometer mirror can include a max scan angle of about −12.5° to about 12.5°, e.g., about −12.5° to about −10°, about −10° to about 0°, about 0° to about 10°, or about 10° to about 12.5°. The galvanometer mirror can include a resolution of about 15 μrad to about 70 μrad, e.g., about 15 μrad to about 20 μrad, about 20 μrad to about 40 μrad, about 40 μrad to about 60 μrad, or about 60 μrad to about 70 μrad.

The 2D-ESFG 100 includes a detector 142 optically coupled to the synchronizer 140, via the ESFG light 136. The detector 142 can include a charge-coupled detector (CCD). The CCD detector can include an integrated circuit having an array of linked, or coupled, p-doped metal-oxide semiconductor capacitors.

The 2D-ESFG 100 can include one or more lenses 144a-f optically coupled to the first potion of light 108, second portion of light 110, third portion of light 114, fourth portion of light 116, ESFG light 136, first portion of ESFG light 136a, or second portion of ESFG light 136b. While only a few locations are shown in FIG. 1, the one or more lenses 144a-f can be placed along any suitable location of the 2D-ESFG 100. The one or more lenses 144a-f can include a substrate suitable for focusing light into a line and/or a point. In an aspect, the one or more lenses can include a cylindrical lens, a spherical lens, and/or a toric lens. For example, the one or more lenses 144a-f can include a cylindrical lens.

The 2D-ESFG 100 can include one or more filters (not shown) optically coupled to the first potion of light 108, second portion of light 110, third portion of light 114, fourth portion of light 116, ESFG light 136, first portion of ESFG light 136a, or second portion of ESFG light 136b. The one or more filters (not shown) can remove fundamental light and/or other light, e.g., extraneous light from the surroundings, in the 2D-ESFG 100. As used herein, "fundamental light," is light that is naturally occurring within the 2D-ESFG 100. As used herein, "other light," is extraneous light that can enter the 2D-ESFG. The one or more filters (not shown) can be placed along any suitable location of the 2D-ESFG 100 such that the first potion of light 108, second portion of light 110, third portion of light 114, fourth portion of light 116, ESFG light 136, first portion of ESFG light 136a, or second portion of ESFG light 136b such that a removal of fundamental light and/or other light, e.g., extraneous light from the surroundings, may be reflected and/or absorbed. For example, the one or more filters can include a 780 nm short-pass filter and/or a 445 nm long-pass filter located along the first portion of ESFG light 136a. As a further example, the one or more filters can include a 780 nm short-pass filter and/or a 445 nm long-pass filter located along the second portion of ESFG light 136b.

Methods

In operation, the amplifier 102 emits the laser light 104 to the first beam splitter 106. For example, an amplifier 102 including a laser source can emit a laser light 104, e.g., about 650 nm to about 1100 nm, such as about 650 nm to about 800 nm, about 800 nm to about 1000 nm, or about 1000 nm to about 1100 nm. In an aspect, the amplifier 102 can pulse the laser light 104. The pulse can provide about 3 milliJoules (mJ) to about 5 mJ of energy, e.g., about 3 mJ to about 3.5 mJ, about 3.5 mJ to about 4 mJ, about 4 mJ to about 4.5 mJ, or about 4.5 mJ to about 5 mJ, for a period of about 1 femtoseconds (fs) to about 1000 fs, e.g., about 1 fs to about 100 fs, about 100 fs to about 500 fs, or about 500 fs to about 1000 fs. The frequency of the amplifier 102 can include a repetition rate of about 0.1 kHz to about 2 kHz, e.g., about 0.1 kHz to about 0.5 kHz, about 0.5 kHz to about 1.0 kHz, about 1.0 kHz to about 1.5 kHz, or about 1.5 kHz to about 2.0 kHz.

In an aspect, the first beam splitter 106 produces a first portion of light 108 and a second portion of light 110 by splitting the laser light 104. For example, the first beam splitter 106 can produce the first portion of light 108 by reflecting about 50% of the laser light 104 as a first portion of light 108. Concurrently, the first beam splitter 106 can produce the second portion of light 110 by transmitting about 50% of the light as a second portion of light 110. In an aspect, the first portion of light 108 can include about 1.0 mJ to about 1.5 mJ of energy, e.g., about 1.0 mJ to about 1.1 mJ, about 1.1 mJ to about 1.2 mJ, about 1.2 mJ to about 1.3 mJ, about 1.3 mJ to about 1.4 mJ, or about 1.4 mJ to about 1.5 mJ.

A third portion of light 114 and a fourth portion of light 114 are produced by directing the second portion of light 110 from the first beam splitter 106 to the second beam splitter 112. In an aspect, the third portion of light 114 can include about 1.0 mJ to about 2.0 mJ of energy, e.g., about 1.0 mJ to about 1.1 mJ, about 1.1 mJ to about 1.2 mJ, about 1.2 mJ to about 1.3 mJ, about 1.3 mJ to about 1.4 mJ, about 1.4 mJ to about 1.5 mJ, about 1.5 mJ to about 1.6 mJ, about 1.6 mJ to about 1.7 mJ, about 1.7 mJ to about 1.8 mJ, about 1.8 mJ to about 1.9 mJ, or about 1.9 mJ to about 2.0 mJ. In an aspect, the fourth portion of light 116 can include about 0.5 μJ to about 1.0 μJ of energy, e.g., about 0.5 μJ to about 0.6

μJ, about 0.6 μJ to about 0.7 μJ, about 0.7 μJ to about 0.8 μJ, about 0.8 μJ to about 0.9 μJ, or about 0.9 μJ to about 1.0 μJ.

The first portion of laser light 104 is directed to the BOPA 120 using the first beam splitter 106 (not shown) or mirror 118a. In an aspect, the BOPA 120 can produce an ultra-broadband short wave infrared light (SWIR) having a wavelength of about 1200 nm to about 2400 nm, e.g., about 1200 nm to about 1400 nm, about 1400 nm to about 1600 nm, about 1600 nm to about 1800 nm, about 1800 nm to about 2000 nm, about 2000 nm to about 2200 nm, or about 2200 nm to about 2400 nm. The BOPA 120 can provide an SWIR having a pulse energy of about 200 μJ to about 300 μJ, e.g., about 200 pJ to about 220 μJ, about 220 μJ to about 240 μJ, about 240 μJ to about 260 μJ, about 260 μJ to about 280 μJ, or about 280 μJ to about 300 μJ, and a pulse duration of about 100 fs to about 300 fs, e.g., about 100 fs to about 150 fs, about 150 fs to about 200 fs, about 200 fs to about 250 fs, or about 250 fs to about 300 fs, when introducing the first portion of light 108 to the BOPA 120.

The third portion of light 114 is directed to the etalon 122 having two or more partially reflective substrate optical flats, as described herein, using a the second beam splitter 112 and/or one or more mirrors (not shown). The optical cavity of the etalon 122 can shape the third portion of light 114 to a wavelength of about 700 nm to about 900 nm, e.g., about 700 nm to about 750 nm, about 750 nm to about 800 nm, about 800 nm to about 850 nm, or about 850 nm to about 900 nm. The etalon 122 can shape the third portion of light 114 to have a pulse energy of about 1.7 mJ to about 1.9 mJ, e.g., about 1.7 mJ to about 1.75 mJ, about 1.75 mJ to about 1.8 mJ, about 1.8 mJ to about 1.85 mJ, or about 1.85 mJ to about 1.9 mJ, and a pulse duration of about 1 picoseconds (ps) to about 1000 ps, e.g., about 1 ps to about 100 ps, about 100 ps to about 500 ps, or about 500 ps to about 1000 ps.

In an aspect, the third portion of light 114 exiting the etalon may be directed to a narrow-band filter 126. The narrow-band filter can selectively transmit the third portion of light 114 that is about 0.1 nm to about 10 nm outside of a predetermined wavelength to the sample 138. For example, the narrow-band filter 126 can selectively transmit the third portion of light 114 having a wavelength of about 800 nm, where the third portion of light 114 having a wavelength of less than 790 nm or greater than 810 nm may be reflected and/or absorbed by the narrow-band filter 126. As a further example, the narrow-band filter 126 can selectively transmit the third portion of light 114 having a wavelength of about 800 nm, where the third portion of light 114 having a wavelength of less than 799.9 nm or greater than 800.1 nm may be reflected and/or absorbed by the narrow-band filter 126.

In an embodiment, the third portion of light 114 exiting the narrow-band filter 126 can be directed using a first stage 124. The first stage 124 can translate mirrors 118j and 118k to adjust an alignment of the third portion of light 114 contacting the sample 138. The first stage can include a motorized stage configured to translate a distance of about 0.1 μm to about 100 mm, e.g., about 1 μm to about 10 μm, about 10 μm to about 100 μm, about 100 μm to about 1 mm, or about 1 mm to about 100 mm. In an aspect, the first stage 124 can be programmable. Without wishing to be bound by theory the first stage 124 can control a time delay between the first portion of light 108 and the third portion of light 114.

The fourth portion of light 116 is directed to the NOPA 128 using the second beam splitter 112 and/or mirror 118c. The NOPA 128 can shape the fourth portion of light 116 to a wavelength of about 500 nm to about 540 nm, e.g. about 500 nm to about 510 nm, about 510 nm to about 520 nm, about 520 nm to about 530 nm, or about 530 nm to about 540. The NOPA 128 can shape the fourth portion of light to a pulse energy of about 5 µJ to about 10 µJ, e.g., about 5 µJ to about 6 µJ, about 6 µJ to about 7 µJ, about 7 µJ to about 8 µJ, about 8 µJ to about 9 µJ, or about 9 µJ to about 10 µJ, and a full width at half max of about 15 nm to about 25 nm, e.g., about 15 nm to about 16 nm, about 16 nm to about 17 nm, about 17 nm to about 18 nm, about 18 nm to about 19 nm, about 19 nm to about 20 nm, about 20 nm to about 21 nm, about 21 nm to about 22 nm, about 22 nm to about 23 nm, about 23 nm to about 24 nm, or about 24 nm to about 25 nm.

The fourth portion of light 116 exits the NOPA 128 and is directed to a dispersive filter pulse shaper 130 using the NOPA 128 and/or one or more mirrors (not shown). In an aspect the dispersive filter pulse shaper 130 generates a pump pulse pair, e.g., a first pulse of light and a second pulse of light. The dispersive filter pulse shaper 130 can allow independent phase and amplitude control over each pulse, as described herein.

In an aspect, the dispersive filter pulse shaper 130 can allow independent phase and amplitude control over each pulse. By controlling the independent phase and amplitude, a scan of $t_1'$ time delay and phase-cycling control can be obtained. For example, a generated pulse pair can be represented by the form $|E(\omega)|(1+\exp[i(\omega_{t_1'}+\varphi_{12})])$ where $E(\omega)$ is the spectral amplitude of the pulse and $\varphi_{12}=\varphi_1-\varphi_2$ is the relative carrier wave phase shift. In an aspect, the 2D signal can be isolated from other contributions by using a two-step phase-cycling, where the two-step phase cycling produces a first wave phase shift, $\varphi_{12}=0$, and a second wave phase shift, $\varphi_{12}=\pi$. In an embodiment, by subtracting the first wave phase shift from the second wave phase shift, or alternatively the second wave shift from the first wave phase shift, a background correction can be performed, thereby providing a background-free spectra. In an aspect, the 2D signal can be isolated from other contributions by using a four-step phase-cycling, where the four-step phase cycling produces a first wave phase shift, $\varphi_{12}=0$, a second wave phase shift, $\varphi_{12}=\pi/2$, a third wave phase shift, $\varphi_{12}=\pi$, and a fourth wave phase shift, $(\varphi_{12}=3/2(\pi))$. In an embodiment, by subtracting the first wave phase shift from the second wave phase shift, or alternatively the third wave shift from the fourth wave phase shift, a background correction can be performed, thereby providing a background-free spectra.

In an embodiment, the fourth portion of light 116 exiting the dispersive filter pulse shaper 130 can be directed using a second stage 132. The second stage 132 can translate mirrors 118n and 118o to adjust an alignment of the fourth portion of light 116 contacting the sample 138. The second stage can include a motorized stage configured to translate a distance of about 0.1 um to about 150 mm, e.g., about 1 µm to about 10 µm, about 10 µm to about 100 µm, about 100 µm to about 1 mm, about 1 mm to about 100 mm, or about 100 mm to about 150 mm. In an aspect, the second stage 132 can be programmable. Without wishing to be bound by theory the second stage 132 can control a time delay, $T_w$, between the pulse pump pairs of the fourth portion of light 116, the first portion of light 108, and the third portion of light 114.

The first portion of light 108 exiting the BOPA 120 is overlaid on the sample 138 with the third portion of the light 114 exiting the etalon 122. The first portion of light 108 and the third portion of light 114 can be aligned and focused on a surface of the sample at a spot size diameter of about 500 µm to about 600 µm, e.g., about 500 µm to about 520 µm, about 520 µm to about 540 µm, about 540 µm to about 560 µm, about 560 µm to about 580 µm, or about 580 µm to about 600 µm, with a lens of about 20 cm focal length at an incident angle of 60° to about 150 µm by a 15 cm focal length lens at an incident angle of 45°. Without being bound by theory, by focusing the third portion of light 108 and the second portion of light 114 can produce an ESFG spectrum covering a wavelength range of about 475 nm to about 550 nm, e.g., about 475 nm to about 500 nm, about 500 nm to about 525 nm, or about 525 nm to about 550 nm.

Concurrently, the fourth portion of light 116 exiting the dispersive filter pulse shaper 130 is spatially overlaid on the sample 138 to produce the ESFG light 136 that reflects off the sample 138. In an aspect, the fourth portion of light 116 can be focused on the surface of the sample 138 at a spot size diameter of about 250 µm to about 300 µm, e.g., about 250 µm to about 260 µm, about 260 µm to about 270 µm, about 270 µm to about 280 µm, about 280 µm to about 290 µm, or about 290 µm to about 300 µm, with a lens of about 25 cm focal length at an incident angle of 37°.

In an aspect, the first portion of laser light 104, the second portion of light 110, the third portion of light 114, the fourth portion of light 116, and/or the ESFG light 136 can be modified by one or more polarizers 134a-c. The one or more polarizers 134a-c can restrict and/or alter parallel and/or perpendicular light with respect to an incident plane of the first portion of laser light 104, the second portion of light 110, the third portion of light 114, the fourth portion of light 116, and/or the ESFG light 136. For example, the one or more polarizers can be oriented to be "p" (parallel to the incident plane) or "s" (perpendicular to the incident plane). As a further example, the one or more polarizers 134a-c can orient the fourth portion of light 116, the ESFG light 136, the third portion of light 114, and the first portion of light 108 to be p, s, s, and p, respectively. Without being bound by theory, the one or more polarizers 134a-c can block light waves of other polarizations, increasing specificity of the light passing through polarizer.

The ESFG light 136 is split using a synchronizer 140 to form a first portion of ESFG light 136a and a second portion of ESFG light 136b. The synchronizer 140 can form the first portion of ESFG light 136a and the second portion of ESFG light 136 by oscillating at a frequency of about 400 Hz to about 600 Hz, e.g., about 400 Hz to about 450 Hz, about 450 Hz to about 500 Hz, about 500 Hz to about 550 Hz, or about 550 Hz to about 600 Hz. Additionally, the synchronizer 140 can form the first portion of ESFG light 136a and the second portion of ESFG light 136 by rotating at a scan angle of about −1.5° to about 1.5° and oscillating at a frequency of about 500 Hz. In an aspect, the synchronizer 140 can produce a two-step phase-cycling system having two waveforms of (0,0) and (0, π). In an aspect, the synchronizer 140 can operate in a step-wise manner and/or continuously rotate over any suitable duration. Alternatively, the synchronizer 140 can produce a four-step phase-cycling system having four waveforms of (0,0), (0, π/2) and (0, π) and (0, 3π/2). Without being bound by theory, by separating the signals of the two-step phase-cycling scheme vertically into two portions of light, e.g., a first portion of ESFG light 136a and a second portion of ESFG light 136b, a background-free 2D-ESFG signal can be collected.

The first portion of ESFG light 136a and the second portion of ESFG light 136b can then be detected using the detector 142. In an aspect, the detector 142 can detect the first portion of ESFG light 136a and the second portion of ESFG light 136b by converting an incoming photon into an electron charge at the semiconductor-oxide interface of the capacitor, thereby providing an electron signal corresponding to the photons entering the detector. Without being bound by theory, detecting the first portion of the ESFG light 136$a$ and the second portion of ESFG light 136$b$, a background correction can be performed, and subsequently a background-free spectra can be obtained.

The signal detected at the detector 142 can be the sum of the rephasing (R) and non-rephasing (NR) signals of the ESFG light 136 as the R and NR signals are in the same phase-matched directions and can be detected concurrently. Without wishing to be bound by theory, by detecting the R and NR signals concurrently, a background spectra can be obtained and a background correction can be performed. The NR and R signals can be isolated by employing the phase-cycling scheme of $\varphi_{12}=0$ and $\varphi_{12}=\pi/2$, according to the below equations:

$$S(\varphi_{12} = 0) \propto R^{(R)} + R^{(NR)} \qquad \text{Eq. 1}$$

$$S(\varphi_{12} = \pi/2) \propto -iR^{(R)} + iR^{(NR)} \qquad \text{Eq. 2}$$

$$S(\varphi_{12} = 0) + iS(\varphi_{12} = \pi/2) \propto R^{(R)} \qquad \text{Eq. 3}$$

$$S(\varphi_{12} = 0) - iS(\varphi_{12} = \pi/2) \propto R^{(NR)} \qquad \text{Eq. 4}$$

Accordingly, performing the combinations and taking the Fourier transform along both $\tau$ and $t_3$ axes can give the 2D rephasing and non-rephasing spectra.

EXAMPLES

Example 1

Figures 2A, 2B:
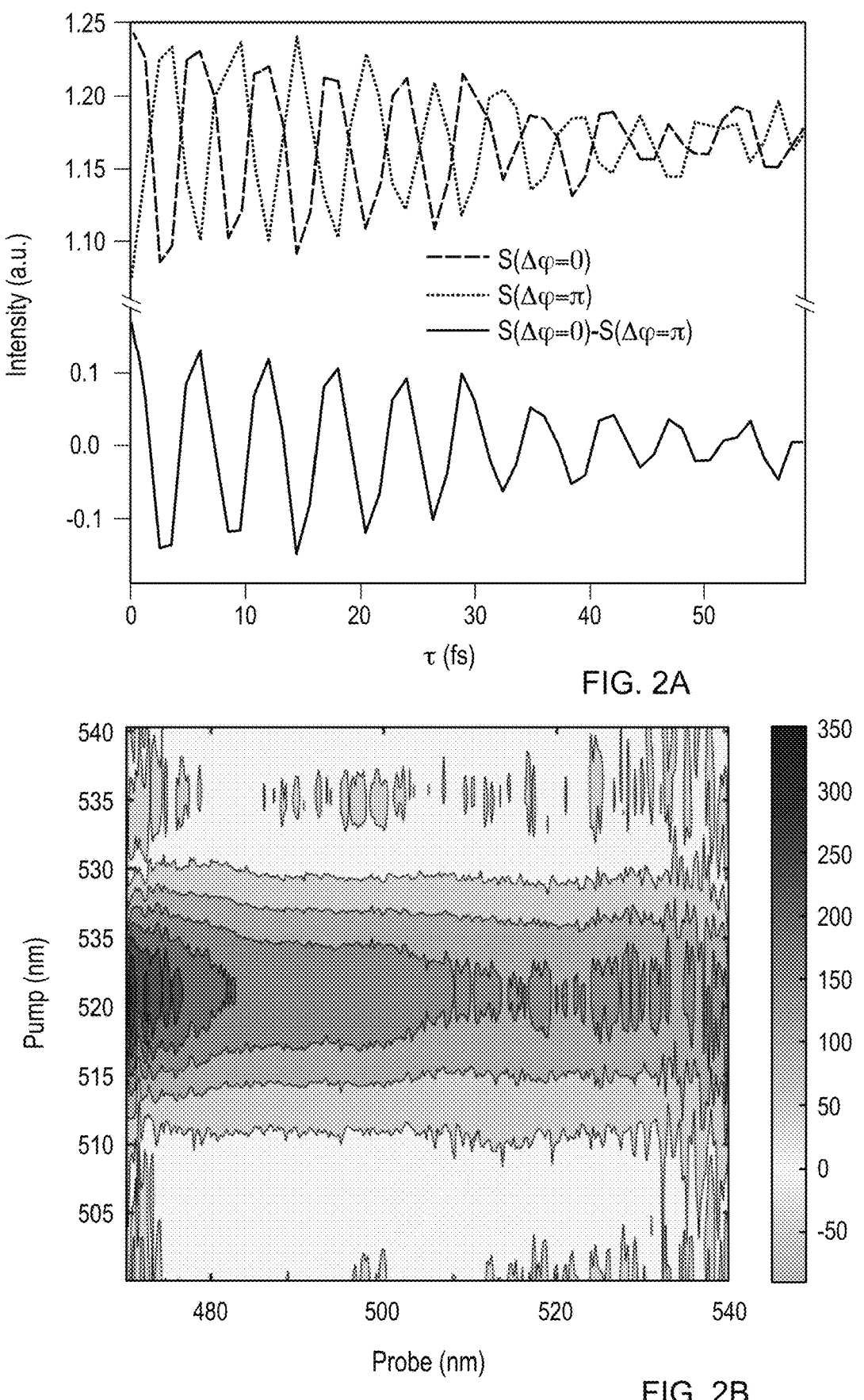
FIG. 2A shows exemplary signal intensity data collected using a 2D-ESFG spectrometer according to at least one aspect of the present disclosure.
FIG. 2B shows exemplary data of an absorptive 2D-ESFG spectrum of n-type Gallium phosphide (GaP) according to at least one aspect of the present disclosure.

Now referring to FIG. 2A, signal intensity data collected using the 2D-ESFG 100, as described herein, is shown. The detected signals, as a function of $\tau$ in a partial rotating frame for $\varphi_{12}=0$ and $\varphi_{12}=\pi$ at the probe wavelength of 503 nm and $T_w$ of 1 ps, where $T_w$ is the time delay between the pump pair of light and the SWIR both showed the oscillatory features with the offsets. The $\varphi_{12}=0$ minus $\varphi_{12}=\pi$ showed the subtraction of the signals for $\varphi_{12}=0$ and $\varphi_{12}=T$. The phases of the oscillatory signal were opposite for (12=0 and (12=T, and the pump-probe background was unchanged. Accordingly, the two-step phase-cycling scheme can remove the pump-probe background and enhance the desired 2D signal, as shown in FIG. 2A.

A reflection geometry was used for the 2D-ESFG apparatus described herein. The reflection geometry can be represented as $S(\tau, T_w, \lambda_3; \varphi_{12})$, where $\tau$ is the time delay between the pump pair of light, $T_w$ is the time delay between the pump pair of light and the SWIR, and $\lambda_3$ is the wavelength of the 2D-ESFG, and $\varphi_{12}$ is the is the relative carrier wave phase shift. A galvanometer mirror operating at 500 Hz collected the signals of $\varphi_{12}=0$ and $\varphi_{12}=\pi$ with the 2D-ESFG described herein for a 10 µM Ap3, SHG imaging solution including (E)-4-((4-(dihexylamino)phenyl)diazenyl)-1-(3-(triethylammonio) propyl)pyridin-1-ium bromide, at $T_w=1$ ps. The frequency domain can be described as $S(\tau, T_w, \lambda_3; \varphi_{12}=0)$ and $S(\tau, T_w, \lambda_3; \varphi_{12}=\pi)$. The background-free signal was obtained by the subtraction: $S(\tau, T_w, \lambda_3)=S(\tau, T_w, \lambda_3; \varphi_{12}=0)-S(\tau, T_w, \lambda_3; \varphi_{12}=T)$. Fourier transform uses data as a function of equally spaced frequency. Therefore, a Jacobian transformation and a subsequent interpolation along the frequency axis was performed to obtain $S(\tau, T_w, f_3)$ so that the Fourier transform could be a function of equally spaced frequency. The Fourier transform data along both $\tau$ and $t_3$ axes, was then used to determine the complex absorptive 2D-ESFG spectrum $S(v_1, T_w, v_3)$. The real part of $S(v_1, T_w, v_3)$ was absorptive, and shown in FIG. 2B. The imaginary part of $(v_1, T_w, v_3)$ showed the dispersive spectrum (not shown).

Example 2

Figure 3:
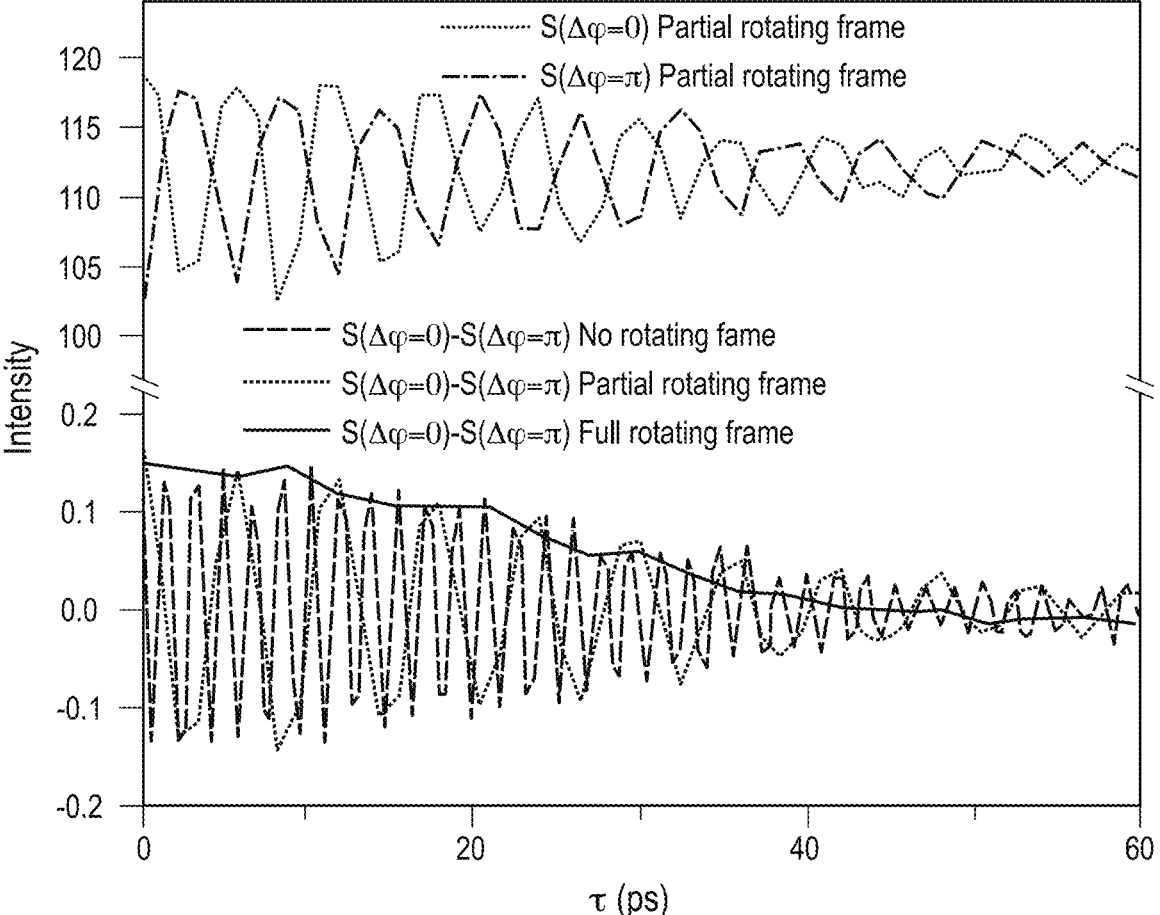
FIG. 3 shows exemplary signal intensity data collected using a 2D-ESFG spectrometer having a rotating frame according to at least one aspect of the present disclosure.

A rotating frame acquisition was performed to collect signal intensity data using the 2D-ESFG, described herein, as a function of coherence time t at 516 nm for $\Delta\phi=0-\Delta\phi=\pi$, and for n-type GaP (100) at $T_w=20$ ps. A spectrum with the scan of $\tau$ was obtained, as shown in FIG. 3. The emitted 2D-ESFG field had the feature of the interferences oscillating at optical frequencies, $E(t, \tau)\propto\exp(-i\omega\tau+i\varphi_{12})$. The sampling steps in the time domain were small, e.g., less than 1 fs such as 0.87 fs at 520 nm, allowing for the acquisition of at least two samples during one optical cycle (subject to the Shannon-Nyquist criterion), the resolution of coherent oscillations, and the determination of frequencies.

Data collection occurred at about 100 data points to characterize the signal at a single time delay, $T_w$. These coherent oscillations were shifted to an arbitrary frequency or completely removed with the dispersive filter pulse shaper 130. By keeping both carrier waves in phase while shifting the time-domain carrier-envelope phase $\phi_{CEP}$ of the second pulse with respect to the first pulse as a function of the time delay $\tau$, $\phi_{CEP}(\omega_0, \tau)=(1-\gamma_0)\omega_0\tau$, where $\omega_0$ is the center frequency of the pump spectrum, and $\gamma_0$ controls the carrier-envelope phase (CEP) evolution when $\gamma_0=1$, no CEP shift between two pulses occurred. Accordingly, the oscillations at the frequency of transition, which is denoted as the no rotating frame measurement occurred. Alternatively, when $\gamma_0=0$ the oscillations were shifted to the origin of the frequency space and oscillated with $\omega-\omega_0$, which is denoted as full rotating frame. Moreover, when $0<\gamma_0<1$, the frequency of the oscillations were reduced and were denoted as partial rotating frame. Without wishing to be bound by theory the $0<\gamma_0<1$, e.g., rotating frame, allowed for, the scan of $T_w$ to be rapid, while maintaining data accuracy and the ability to obtain a background-free spectra.

Example 3

A partially rotating sampling scheme with $\gamma_0=0.3$, and 50 $\tau$ steps evenly between 0 and 60 fs was performed for In-type GaP (100) at $T_w=20$ ps using the $\Delta\phi=0$ and $\Delta\phi=\pi/2$ phase cycling scheme was performed, where a four-step phase-cycling scheme was performed a four-step phase-cycling scheme, $\varphi_{12}=0, \pi/2, \pi, 3\pi/2$. Each measurement was performed over 5 minutes at one $T_w$. An additional subtraction was performed to obtain a background free signal of $(\varphi_{12}=0)$ and $S(\varphi_{12}=\pi/2)$, according to the following equation:

$$S(\varphi_{12} = 3\pi/2) \propto iR^{(R)} - iR^{(NR)} \propto -S(\varphi_{12} = \pi/2) \qquad \text{Eq. 5}$$

$$[S(\varphi_{12} = 0) - S(\varphi_{12} = \pi/2)] + \qquad \text{Eq. 6}$$

$$[S(\varphi_{12} = 0) - S(\varphi_{12} = 3\pi/2)] \propto S(\varphi_{12} = 0)$$

$$[S(\varphi_{12} = \pi/2) - S(\varphi_{12} = 0)] - \qquad \text{Eq. 7}$$

$$[S(\varphi_{12} = 3\pi/2) - S(\varphi_{12} = 0)] \propto S(\varphi_{12} = \pi/2)$$

Figure 4A:
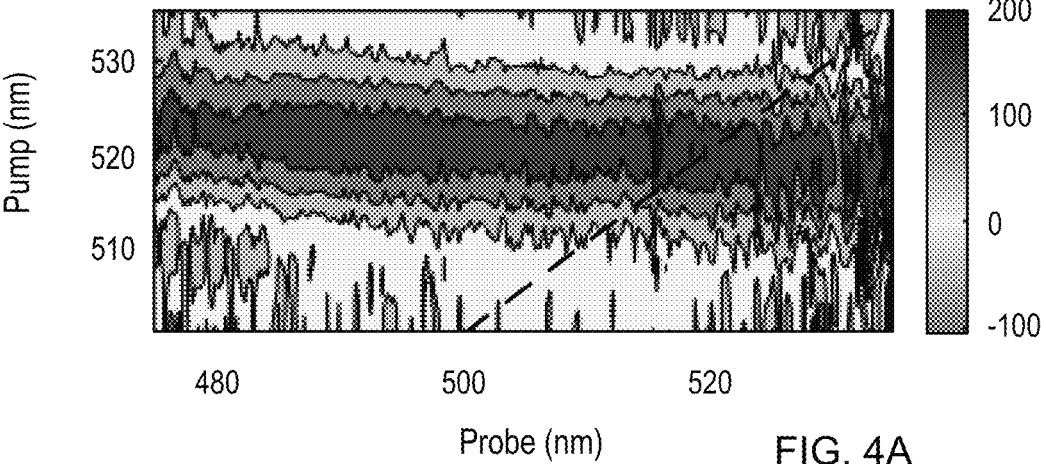
FIG. 4A shows exemplary data of a real part of rephrasing signal of In-type GaP (100) according to at least one aspect of the present disclosure.
Figure 4B:
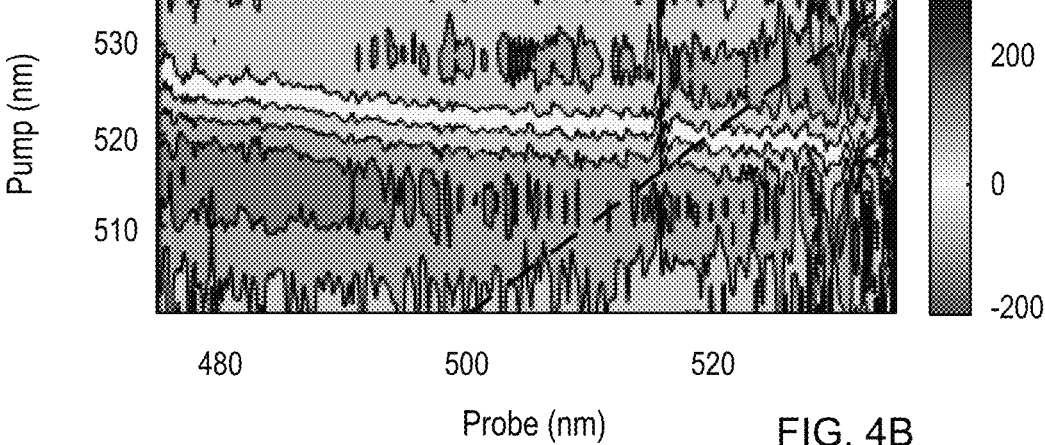
FIG. 4B shows exemplary data of an imaginary part of rephrasing signal of In-type GaP (100) according to at least one aspect of the present disclosure.
Figure 4C:
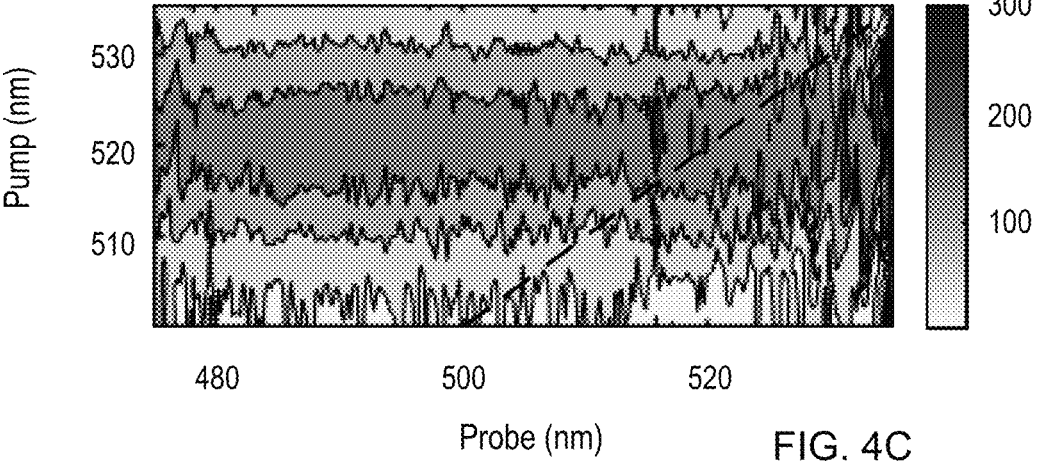
FIG. 4C shows exemplary data of an absorption signal of rephrasing signal of In-type GaP (100) according to at least one aspect of the present disclosure.
Figure 5A:
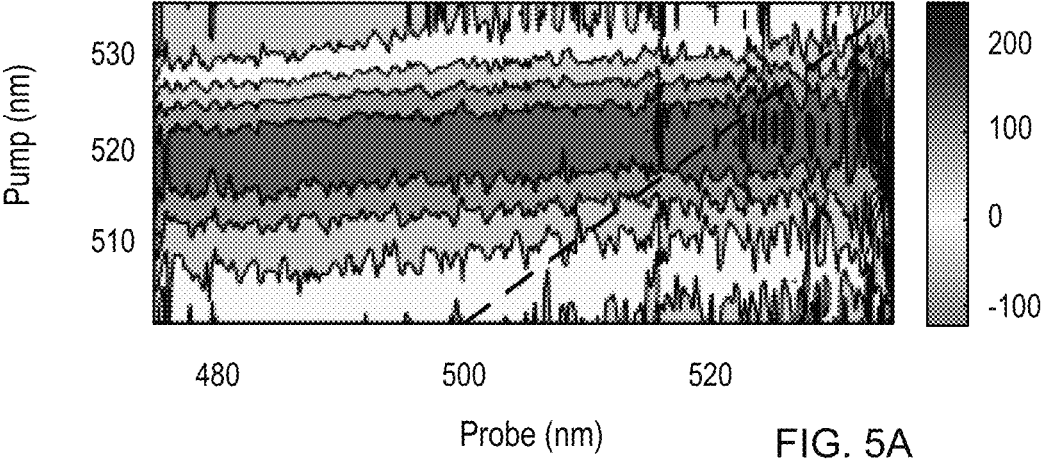
FIG. 5A shows exemplary data of a real part of non-rephrasing signal of In-type GaP (100) according to at least one aspect of the present disclosure.
Figure 5B:
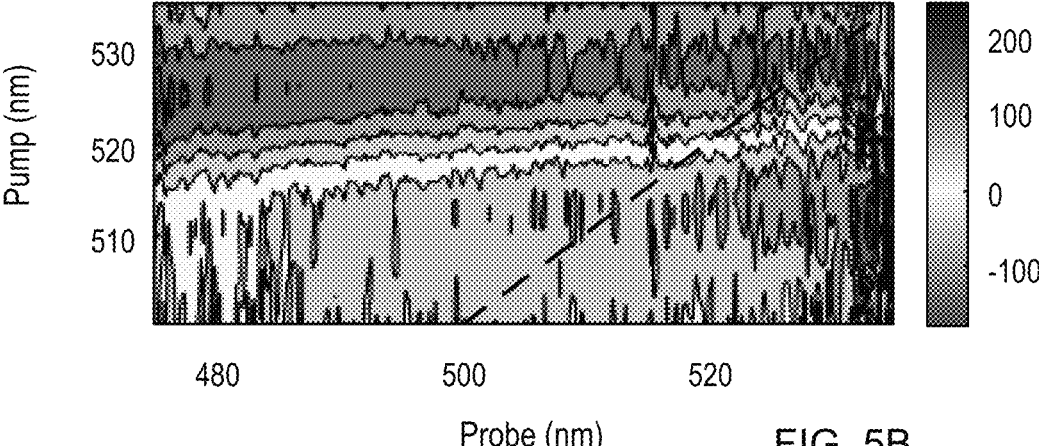
FIG. 5B shows exemplary data of an imaginary part of non-rephrasing signal of In-type GaP (100) according to at least one aspect of the present disclosure.
Figure 5C:
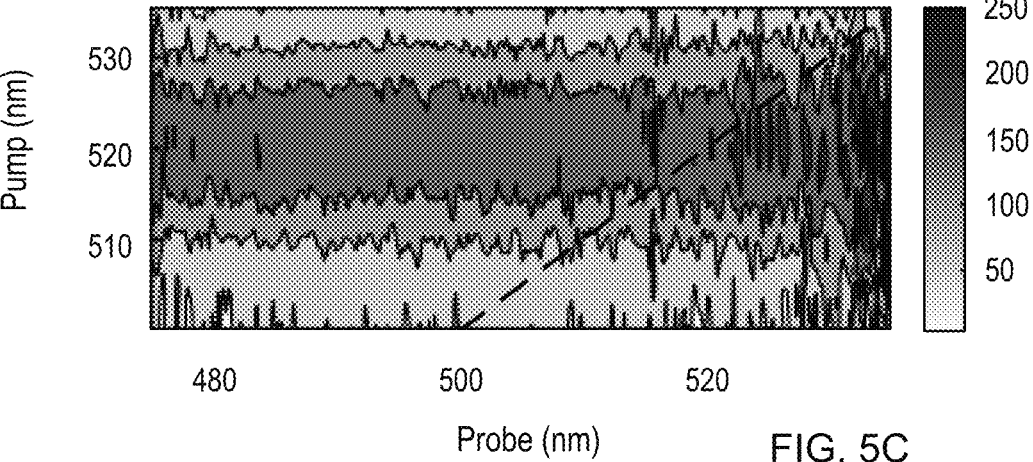
FIG. 5C shows exemplary data of an absorption signal of non-rephrasing signal of In-type GaP (100) according to at least one aspect of the present disclosure.
Figure 6A:
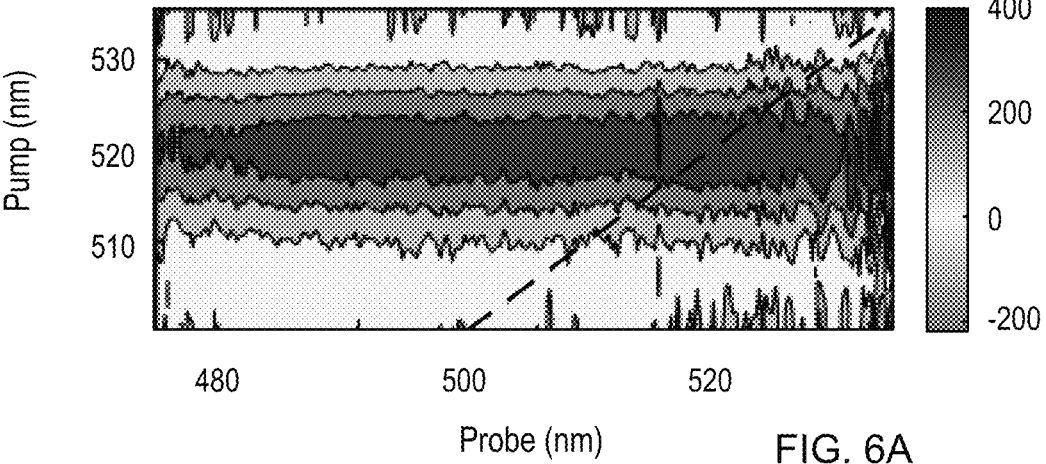
FIG. 6A shows exemplary data of a sum of a real part of the rephrasing and non-rephasing signals of In-type GaP (100) according to at least one aspect of the present disclosure.
Figure 6B:
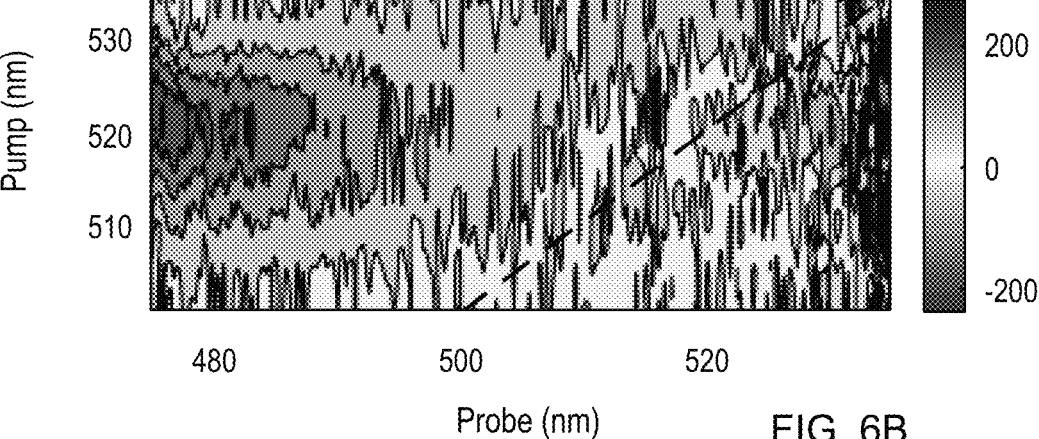
FIG. 6B shows exemplary data of a sum of an imaginary part of the rephrasing and non-rephasing signals of In-type GaP (100) according to at least one aspect of the present disclosure.
Figure 6C:
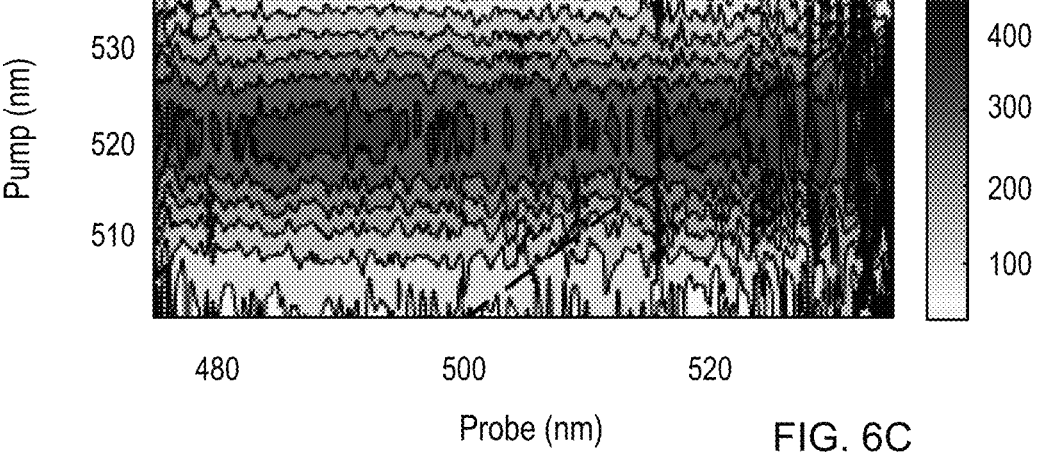
FIG. 6C shows exemplary data of a sum of an absorption signal of the rephrasing and non-rephasing signals of In-type GaP (100) according to at least one aspect of the present disclosure.

Combinations and Fourier transformations along both $\tau$ and $t_3$ were performed to get the 2D rephasing and non-rephasing spectra. The signal $S(\varphi_{12}=0)$ and $S(\varphi_{12}=\pi)$ in this phase-cycling provided the 2D absorption spectrum. Rephasing spectra obtained from the four-step phase-cycling scheme are shown in FIGS. 4A-4C. Non-rephasing spectra obtained from the four-step phase-cycling scheme are shown in FIGS. 5A-5C. A sum of the rephasing spectra and non-rephasing spectra obtained from the four-step phase-cycling scheme are shown in FIGS. 6A-6C. Without being bound by theory, the four-step phase-cycling scheme allowed for a rapid analysis, background free spectra, to be collected.

ASPECTS LISTING

The present disclosure provides, among others, the following aspects, each of which can be considered as optionally including any alternate aspects:

Clause 1. A two-dimensional electronic sum frequency generation (2D-ESFG) apparatus, the apparatus comprising: an amplifier comprising a laser source; a broadband optical parametric amplifier (BOPA) optically coupled to the amplifier, the BOPA comprising a two-stage amplifier; an etalon optically coupled to the amplifier, the etalon comprising two or more partially reflective substrate optical flats; a noncollinear optical parametric amplifier (NOPA) optically coupled to the amplifier; a dispersive filter pulse shaper optically coupled to the NOPA; a synchronizer comprising a galvanometer mirror optically coupled to the BOPA, the etalon, and the dispersive filter pulse shaper; and a detector optically coupled to the synchronizer.

Clause 2. The apparatus of clause 1, wherein the laser source comprises a titanium:sapphire laser.

Clause 3. The apparatus of any one of clauses 1 or 2, further comprising a first beam splitter and a second beam splitter.

Clause 4. The apparatus of clause 3, wherein the first beam splitter is optically coupled to the amplifier, the BOPA, and the second beam splitter.

Clause 5. The apparatus of clause 3, wherein the second beam splitter is optically coupled to the first beam splitter, the etalon, and the NOPA.

Clause 6. The apparatus of any one of clauses 1-5, wherein the galvanometer mirror comprises a single-axis galvanometer mirror.

Clause 7. The apparatus of any one of clauses 1-6, wherein the detector comprises a charge-coupled detector (CCD).

Clause 8. A two-dimensional electronic sum frequency generation (2D-ESFG) apparatus, the apparatus comprising: an amplifier comprising a laser source adapted to emit a laser light; a noncollinear optical parametric amplifier (NOPA) adapted to shape the laser light emitted from the amplifier; a dispersive filter pulse shaper adapted to generate a pulse pump pair from the laser light shaped by the NOPA; a synchronizer comprising a galvanometer mirror adapted to reflect the pulse pump pair; and a detector adapted to detect a wavelength of the pulse pump pair.

Clause 9. The apparatus of clause 8, wherein the laser source comprises a titanium:sapphire laser.

Clause 10. The apparatus of any one of clauses 8 or 9, further comprising a first beam splitter optically coupled to an amplifier.

Clause 11. The apparatus of clause 10, wherein the first beam splitter is further optically coupled to a second beam splitter.

Clause 12. The apparatus of clause 11, wherein the second beam splitter is further optically coupled to the NOPA.

Clause 13. The apparatus of any one of clauses 8-12, wherein the galvanometer mirror comprises a single-axis galvanometer mirror.

Clause 14. The apparatus of any one of clauses 8-14, wherein the detector comprises a charge-coupled detector (CCD).

Clause 15. A method, the method comprising: emitting a light from an amplifier to a first beam splitter, the first beam splitter configured to produce a first portion of light and a second portion of light; producing a third portion of light and a fourth portion of light by directing the second portion of light to a second beam splitter; directing the first portion of light to a broadband optical parametric amplifier (BOPA); directing the third portion of light to an etalon comprising two or more partially reflective substrate optical flats; directing the fourth portion of light to a noncollinear optical parametric amplifier (NOPA), wherein the fourth portion of light exits the NOPA and is directed to a dispersive filter pulse shaper; producing an ESFG light by overlaying the first portion of light exiting the BOPA, the third portion of light exiting the etalon, and the fourth portion of light exiting the dispersive filter pulse shaper on a sample; splitting the ESFG light using a synchronizer to form a first portion of ESFG light and a second portion of ESFG light; and detecting the first portion of ESFG light and the second portion of ESFG light.

Clause 16. The method of clause 15, wherein the first portion of light comprises an ultra-broadband short wave infrared light (SWIR) comprising: a wavelength of about 1200 nm to about 2400 nm; pulse energy of about 200 μJ to about 300 μJ; and a pulse duration of about 100 fs to about 300 fs.

Clause 17. The method of any one of clauses 15 or 16, wherein the third portion of light comprises: a wavelength of about 700 nm to about 900 nm; a pulse energy of about 1.7 mJ to about 1.9 mJ; and a pulse duration of about 1 ps to about 1000 ps.

Clause 18. The method of any one of clauses 15-17, wherein the fourth portion of light comprises: a wavelength of about 500 nm to about 540 nm; and a pulse energy of about 5 μJ to about 10 μJ.

Clause 19. The method of any one of clauses 15-18, further comprising splitting the ESFG light by rotating the synchronizer at a scan angle of about −1.5° to about 1.5°.

Clause 20. The method of any one of clauses 15-19, further comprising splitting the ESFG light by oscillating the synchronizer at a frequency of about 400 Hz to about 600 Hz.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, for example, the terms "comprising," "consisting essentially of," "consisting of" also include the product of the combinations of elements listed after the term.

The use of headings is for purposes of convenience only and does not limit the scope of the present disclosure.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "about" when referring to a measurable value such as an amount, a temporal duration, and the like, is meant to encompass variations of ±20%, ±15, ±10%, ±5%, ±1%, or ±0.1% from the specified value, as such variations are appropriate.

As used herein, the indefinite article "a" or "an" shall mean "at least one" unless specified to the contrary or the context clearly indicates otherwise. For example, aspects comprising "a metal" include aspects comprising one, two, or more metals, unless specified to the contrary or the context clearly indicates only one metal is included.

While the foregoing is directed to aspects of the present disclosure, other and further aspects of the disclosure may be devised without departing from the basic scope thereof, and the scope thereof is determined by the claims that follow.

What is claimed is:

1. A two-dimensional electronic sum frequency generation (2D-ESFG) apparatus, the apparatus comprising:
an amplifier comprising a laser source;
a broadband optical parametric amplifier (BOPA) optically coupled to the amplifier, the BOPA comprising a two-stage amplifier;
an etalon optically coupled to the amplifier, the etalon comprising two or more partially reflective substrate optical flats;
a noncollinear optical parametric amplifier (NOPA) optically coupled to the amplifier;
a dispersive filter pulse shaper optically coupled to the NOPA;
a synchronizer comprising a galvanometer mirror optically coupled to the BOPA, the etalon, and the dispersive filter pulse shaper; and
a detector optically coupled to the synchronizer.

2. The apparatus of claim 1, wherein the laser source comprises a titanium:sapphire laser.

3. The apparatus of claim 1, further comprising a first beam splitter and a second beam splitter.

4. The apparatus of claim 3, wherein the first beam splitter is optically coupled to the amplifier, the BOPA, and the second beam splitter.

5. The apparatus of claim 3, wherein the second beam splitter is optically coupled to the first beam splitter, the etalon, and the NOPA.

6. The apparatus of claim 1, wherein the galvanometer mirror comprises a single-axis galvanometer mirror.

7. The apparatus of claim 1, wherein the detector comprises a charge-coupled detector (CCD).

8. A two-dimensional electronic sum frequency generation (2D-ESFG) apparatus, the apparatus comprising:
an amplifier comprising a laser source adapted to emit a laser light;
a noncollinear optical parametric amplifier (NOPA) adapted to shape the laser light emitted from the amplifier;
a dispersive filter pulse shaper adapted to generate a pulse pump pair from the laser light shaped by the NOPA;
a synchronizer comprising a galvanometer mirror adapted to reflect the pulse pump pair; and
a detector adapted to detect a wavelength of the pulse pump pair.

9. The apparatus of claim 8, wherein the laser source comprises a titanium:sapphire laser.

10. The apparatus of claim 8, further comprising a first beam splitter optically coupled to an amplifier.

11. The apparatus of claim 10, wherein the first beam splitter is further optically coupled to a second beam splitter.

12. The apparatus of claim 11, wherein the second beam splitter is further optically coupled to the NOPA.

13. The apparatus of claim 8, wherein the galvanometer mirror comprises a single-axis galvanometer mirror.

14. The apparatus of claim 8, wherein the detector comprises a charge-coupled detector (CCD).

15. A method, the method comprising:
emitting a light from an amplifier to a first beam splitter, the first beam splitter configured to produce a first portion of light and a second portion of light;
producing a third portion of light and a fourth portion of light by directing the second portion of light to a second beam splitter;
directing the first portion of light to a broadband optical parametric amplifier (BOPA);
directing the third portion of light to an etalon comprising two or more partially reflective substrate optical flats;
directing the fourth portion of light to a noncollinear optical parametric amplifier (NOPA), wherein the fourth portion of light exits the NOPA and is directed to a dispersive filter pulse shaper;
producing an electronic sum frequency generation (ESFG) light by overlaying the first portion of light exiting the BOPA, the third portion of light exiting the etalon, and the fourth portion of light exiting the dispersive filter pulse shaper on a sample;
splitting the ESFG light using a synchronizer to form a first portion of ESFG light and a second portion of ESFG light; and
detecting the first portion of ESFG light and the second portion of ESFG light.

16. The method of claim 15, wherein the first portion of light comprises an ultra-broadband short wave infrared light (SWIR) comprising:
a wavelength of about 1200 nm to about 2400 nm;
pulse energy of about 200 µJ to about 300 µJ; and
a pulse duration of about 100 fs to about 300 fs.

17. The method of claim 15, wherein the third portion of light comprises:
a wavelength of about 700 nm to about 900 nm;
a pulse energy of about 1.7 mJ to about 1.9 mJ; and
a pulse duration of about 1 ps to about 1000 ps.

18. The method of claim 15, wherein the fourth portion of light comprises:

a wavelength of about 500 nm to about 540 nm; and a pulse energy of about 5 μJ to about 10 μJ.

19. The method of claim 15, further comprising splitting the ESFG light by rotating the synchronizer at a scan angle of about −1.5° to about 1.5°.

20. The method of claim 15, further comprising splitting the ESFG light by oscillating the synchronizer at a frequency of about 400 Hz to about 600 Hz.

\* \* \* \* \*